No. 734,096. PATENTED JULY 21, 1903.
J. R. ROGERS.
LINOTYPE MACHINE.
APPLICATION FILED APR. 26, 1901.
NO MODEL. 19 SHEETS—SHEET 1.

WITNESSES:
INVENTOR
Jno. R. Rogers
BY Philip T. Dodge
ATTORNEY

No. 734,096. PATENTED JULY 21, 1903.
J. R. ROGERS.
LINOTYPE MACHINE.
APPLICATION FILED APR. 26, 1901.
NO MODEL. 19 SHEETS—SHEET 2.

WITNESSES:

INVENTOR
Jno. R. Rogers
BY
Philip T. Dodge
ATTORNEY

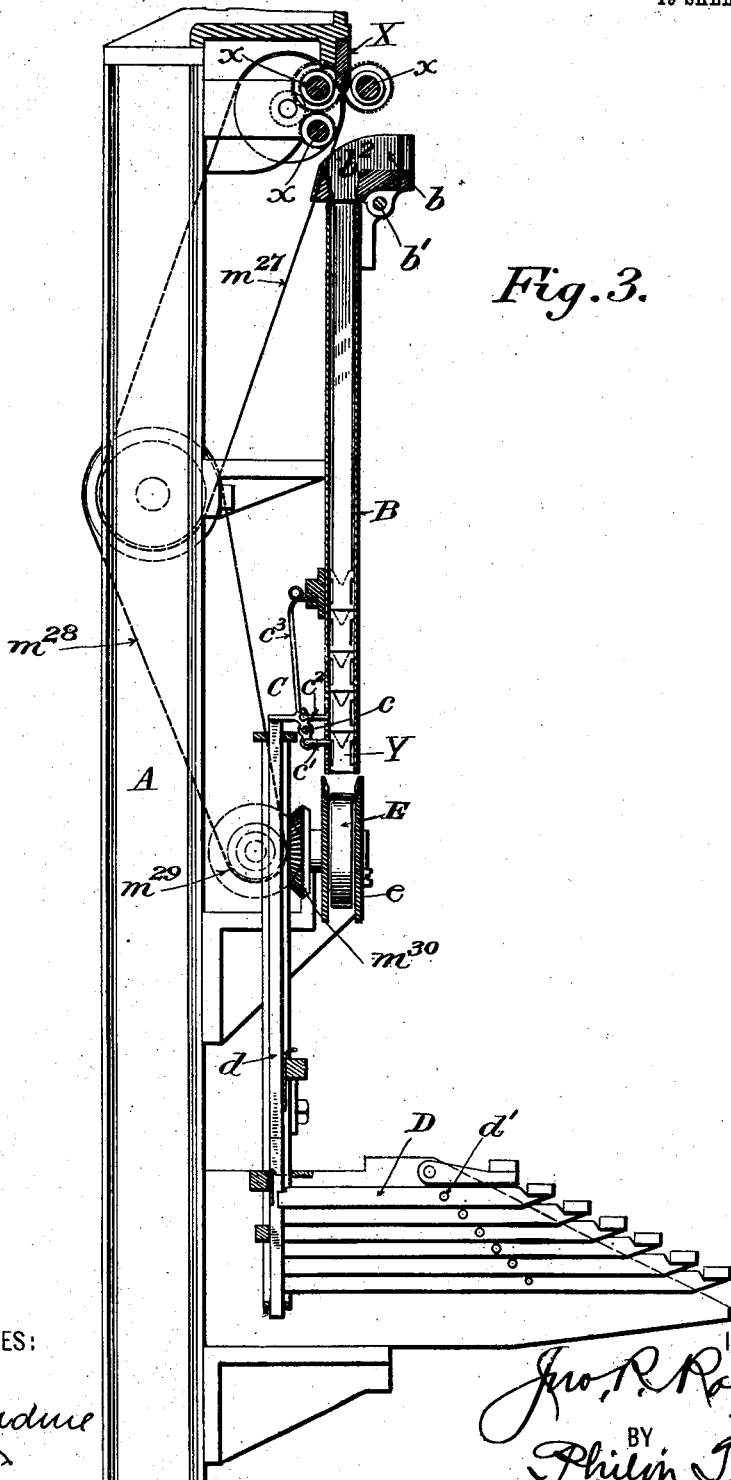

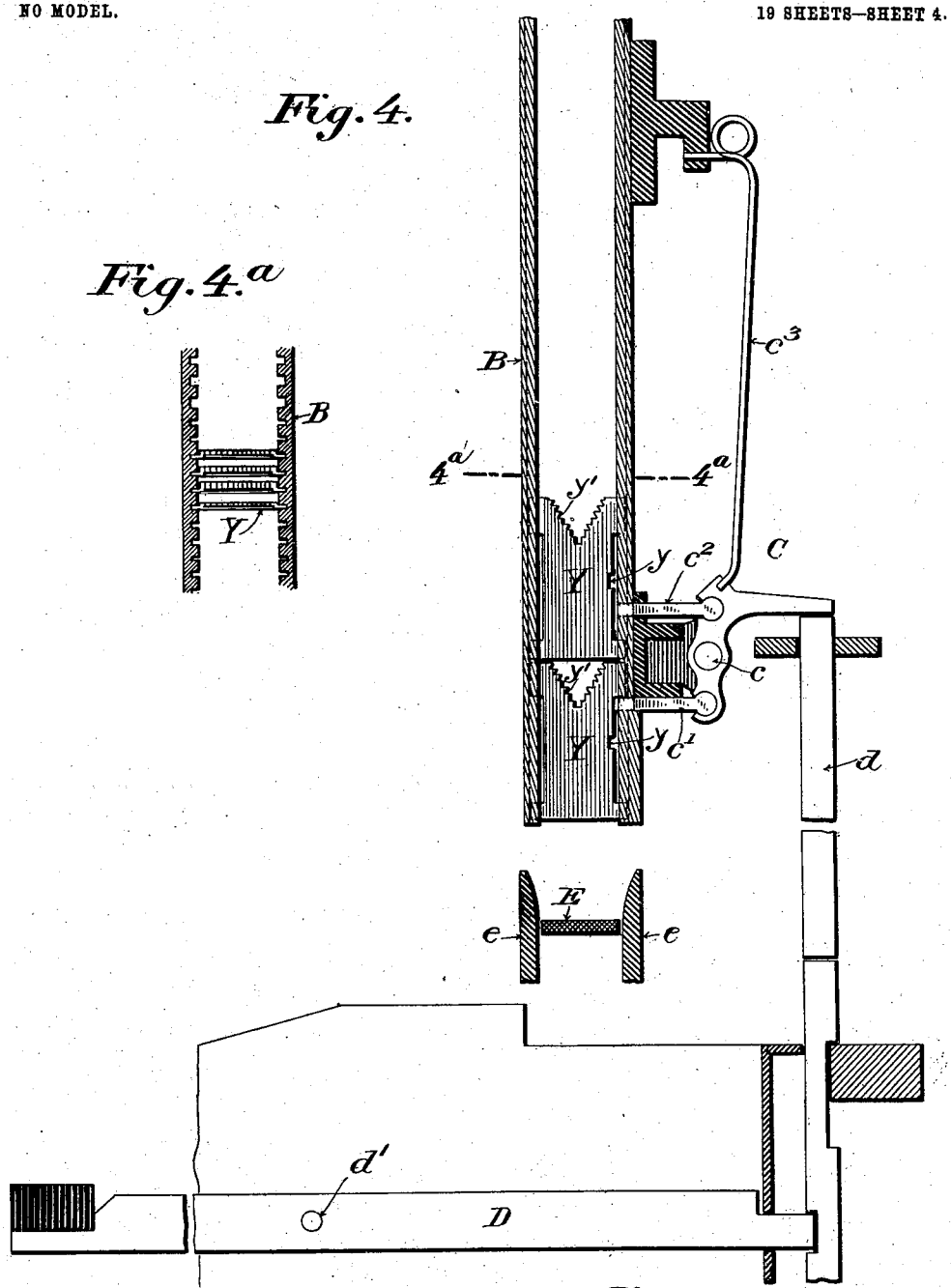

No. 734,096. PATENTED JULY 21, 1903.
J. R. ROGERS.
LINOTYPE MACHINE.
APPLICATION FILED APR. 26, 1901.
NO MODEL. 19 SHEETS—SHEET 5.
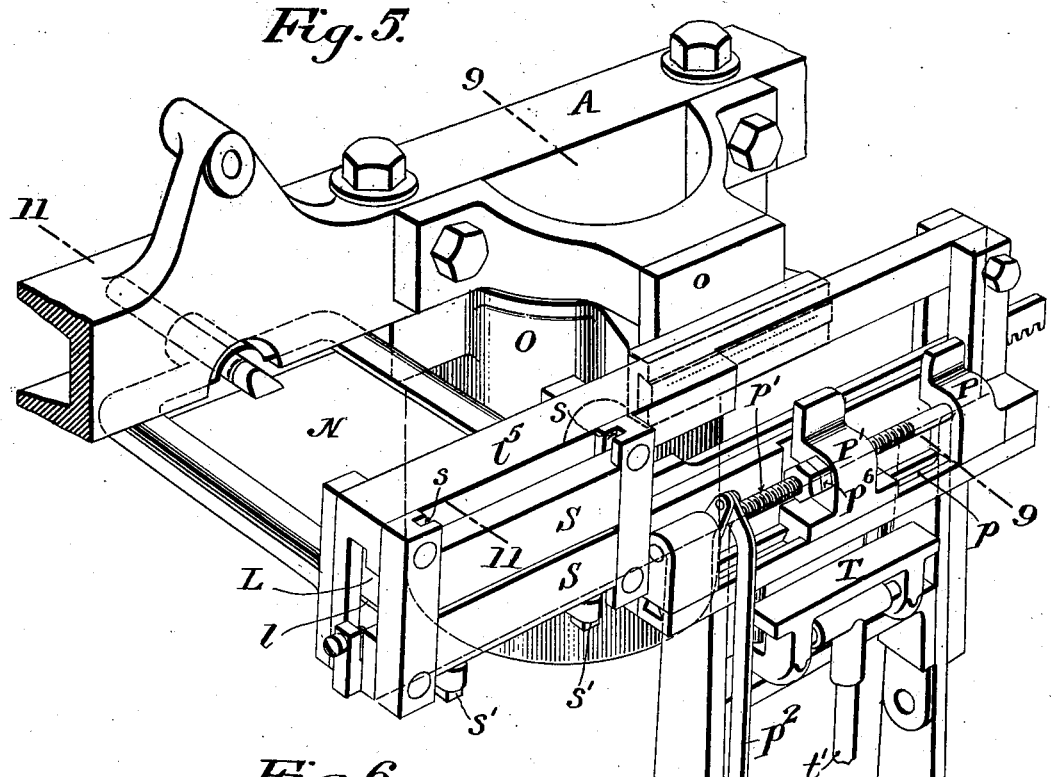
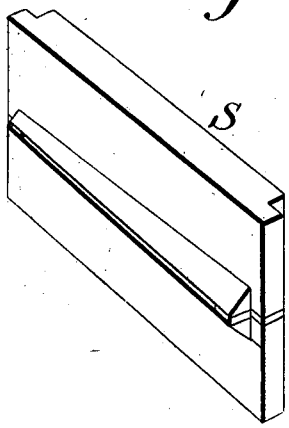

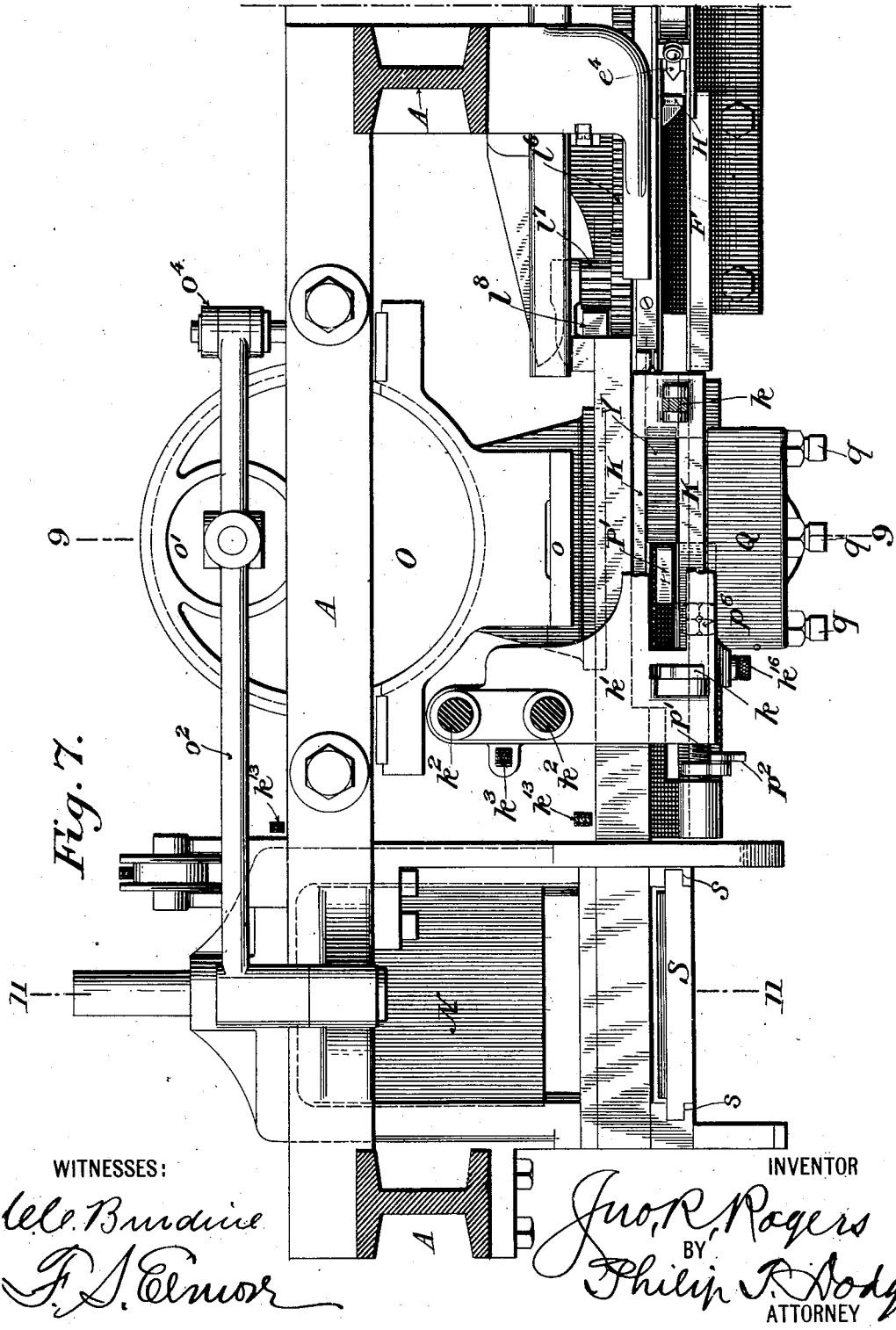

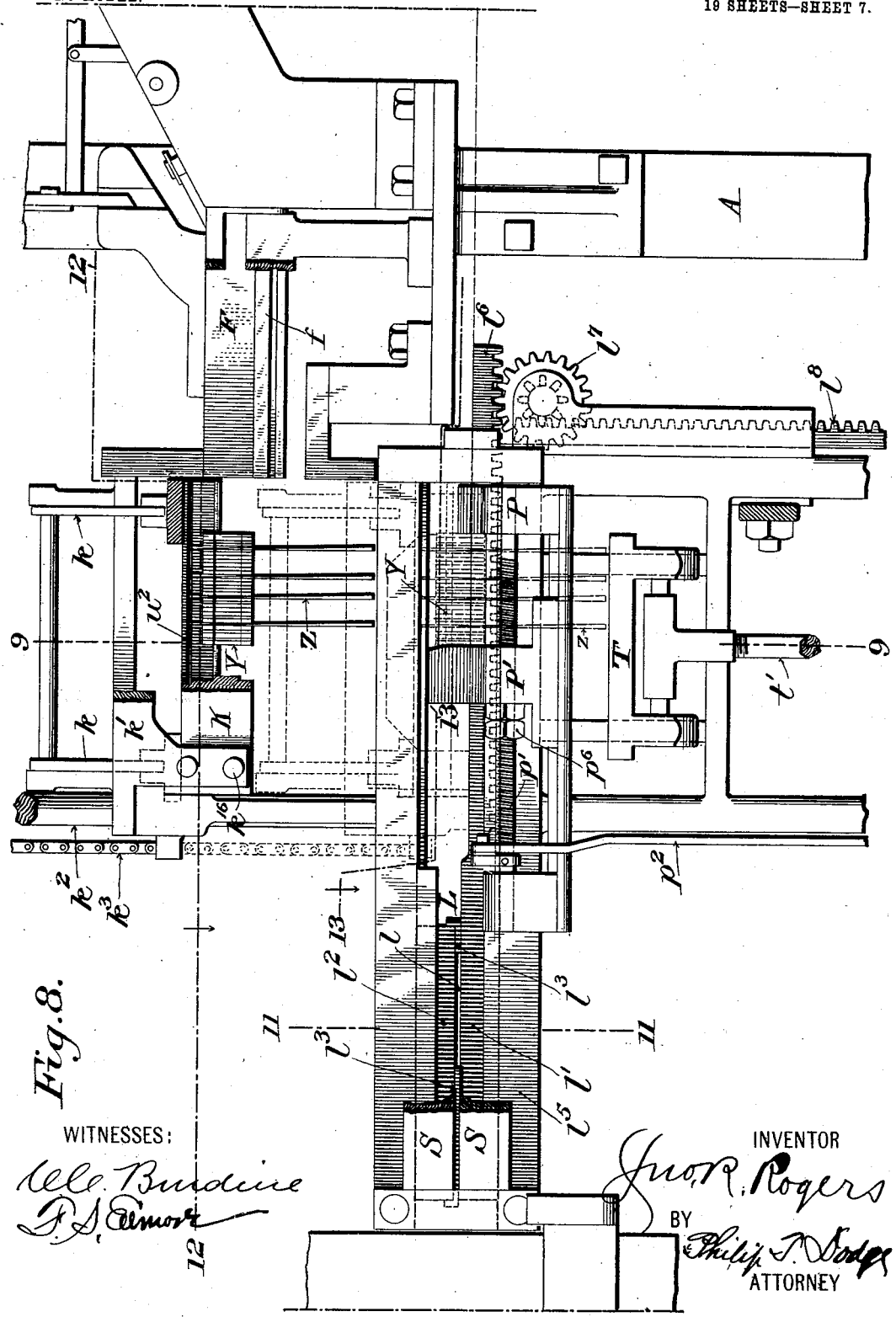

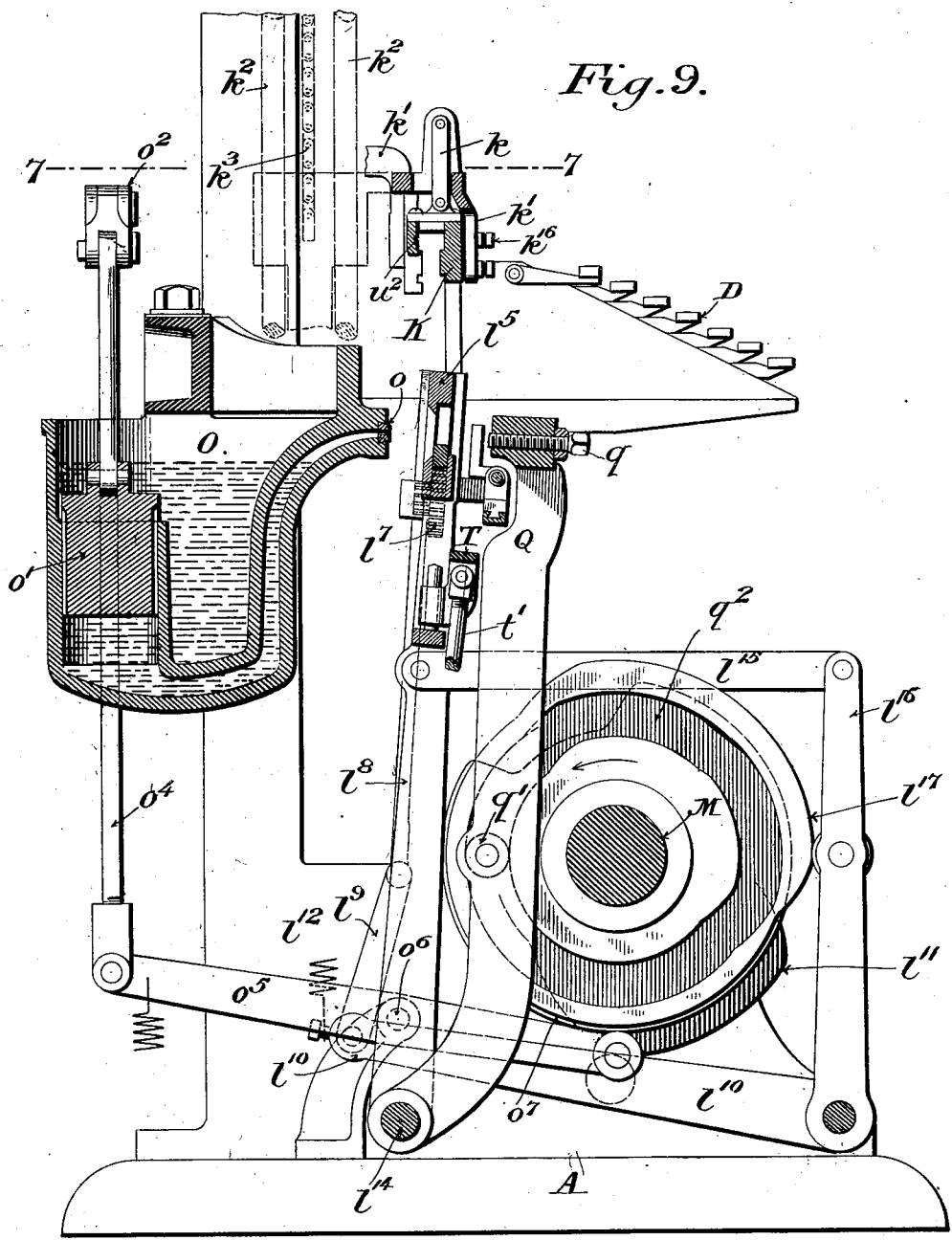

No. 734,096. PATENTED JULY 21, 1903.
J. R. ROGERS.
LINOTYPE MACHINE.
APPLICATION FILED APR. 26, 1901.
NO MODEL. 19 SHEETS—SHEET 11.
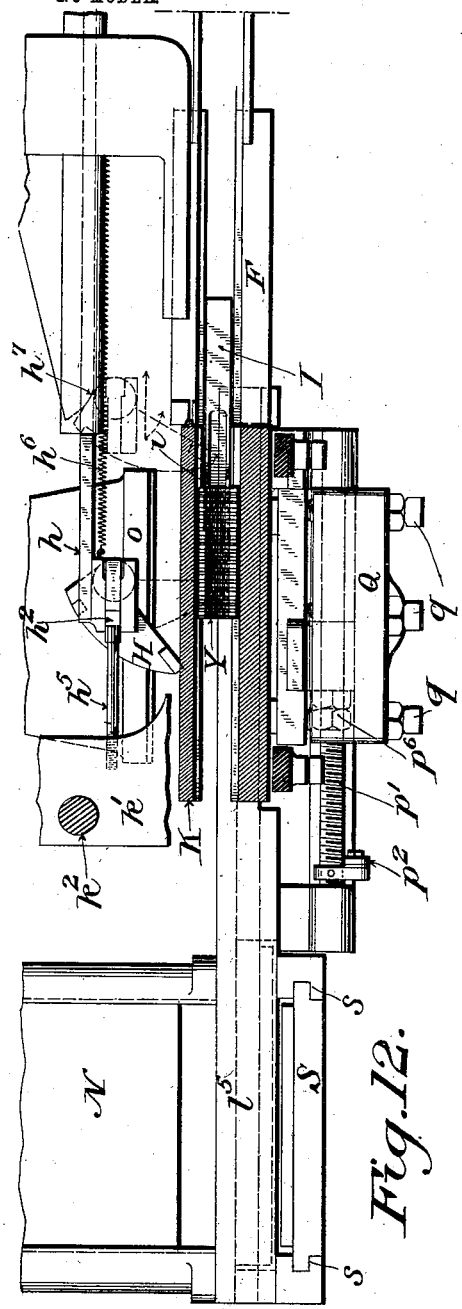
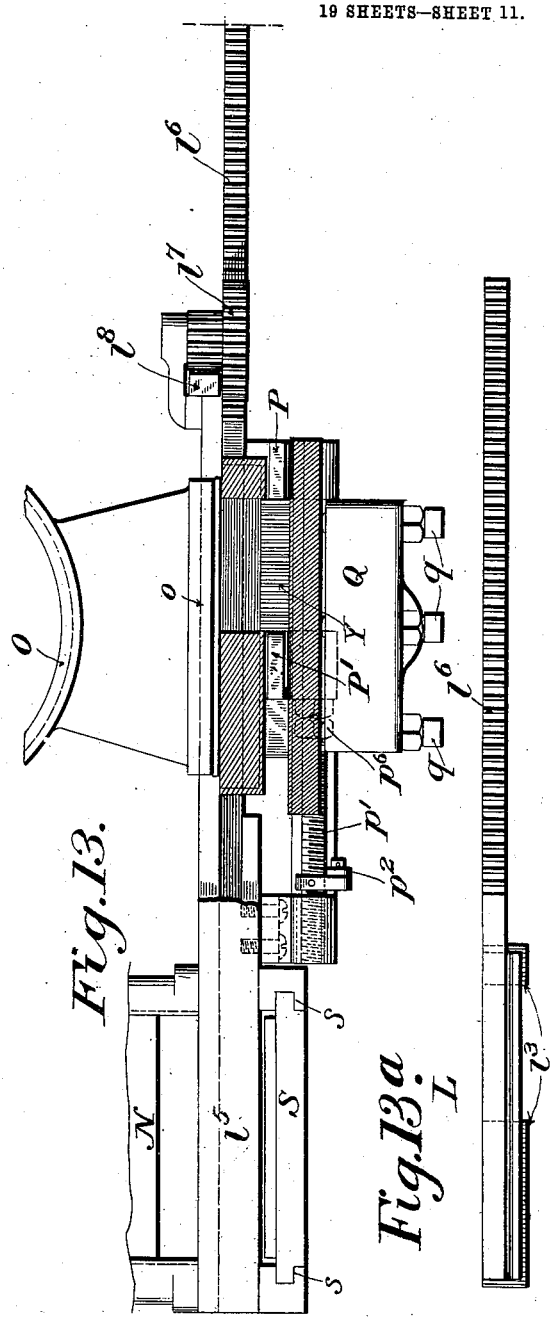
WITNESSES:
INVENTOR
Jno. R. Rogers
BY
Philip J. Dodge
ATTORNEY

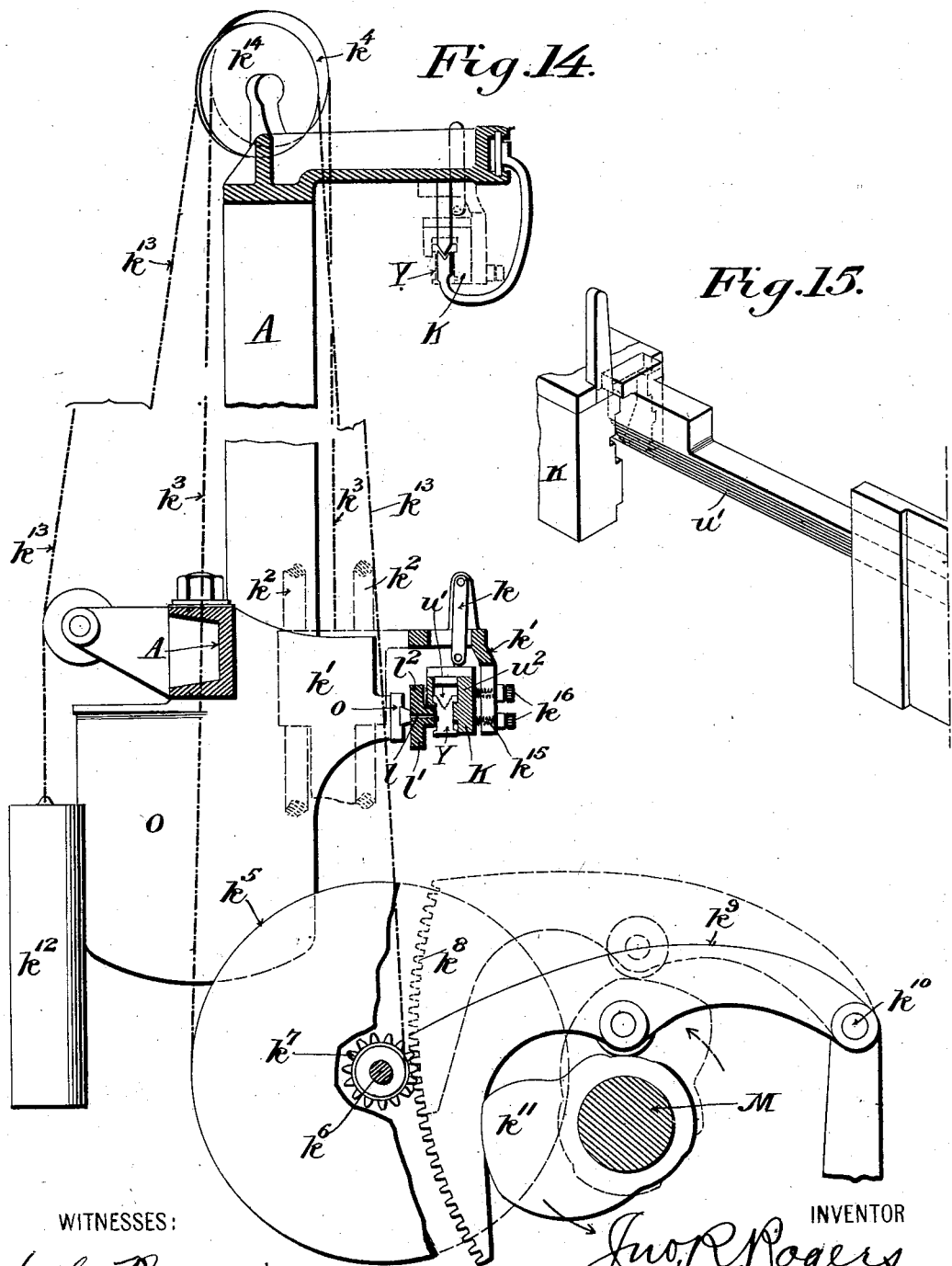

No. 734,096. PATENTED JULY 21, 1903.
J. R. ROGERS.
LINOTYPE MACHINE.
APPLICATION FILED APR. 26, 1901.
NO MODEL. 19 SHEETS—SHEET 13.
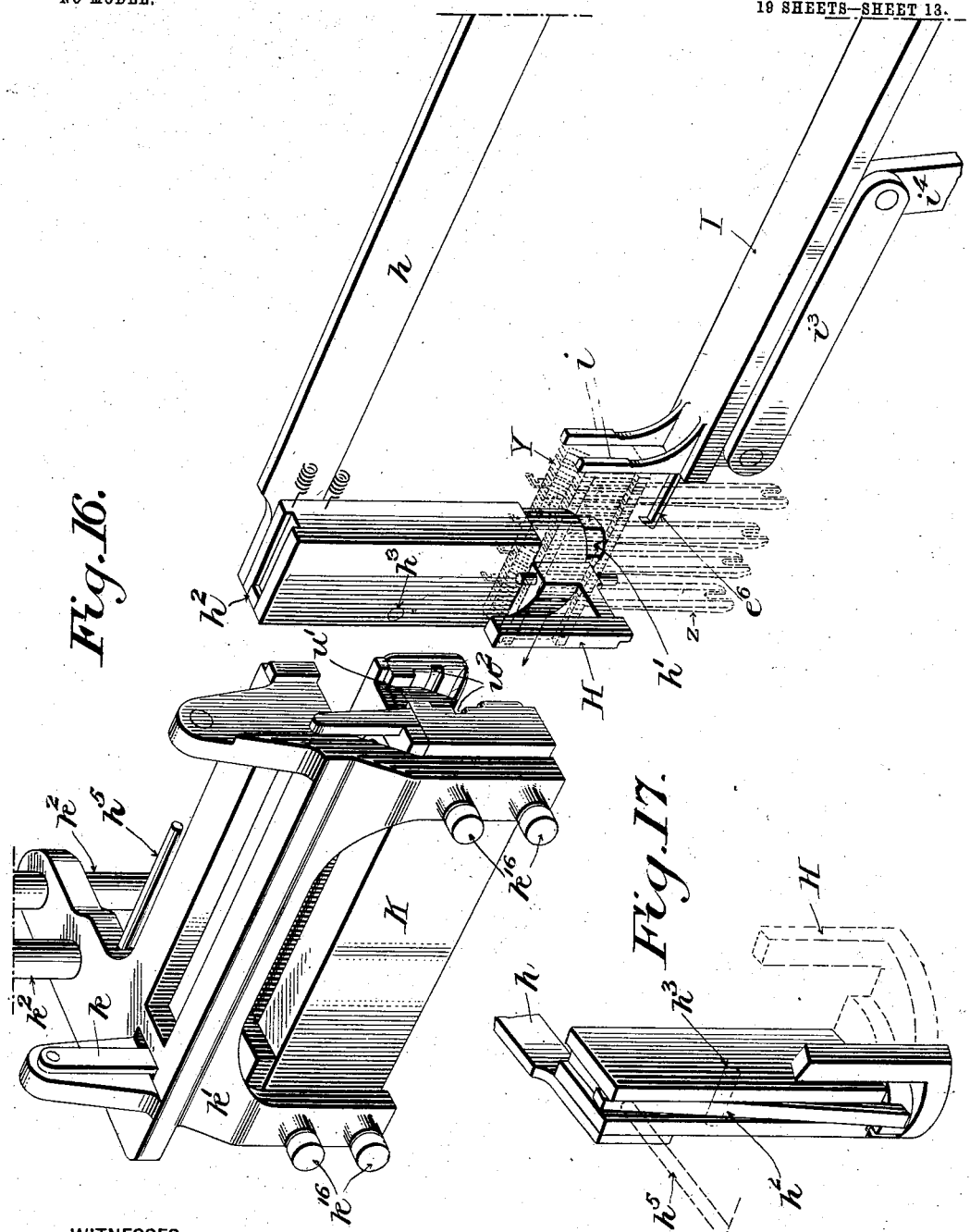

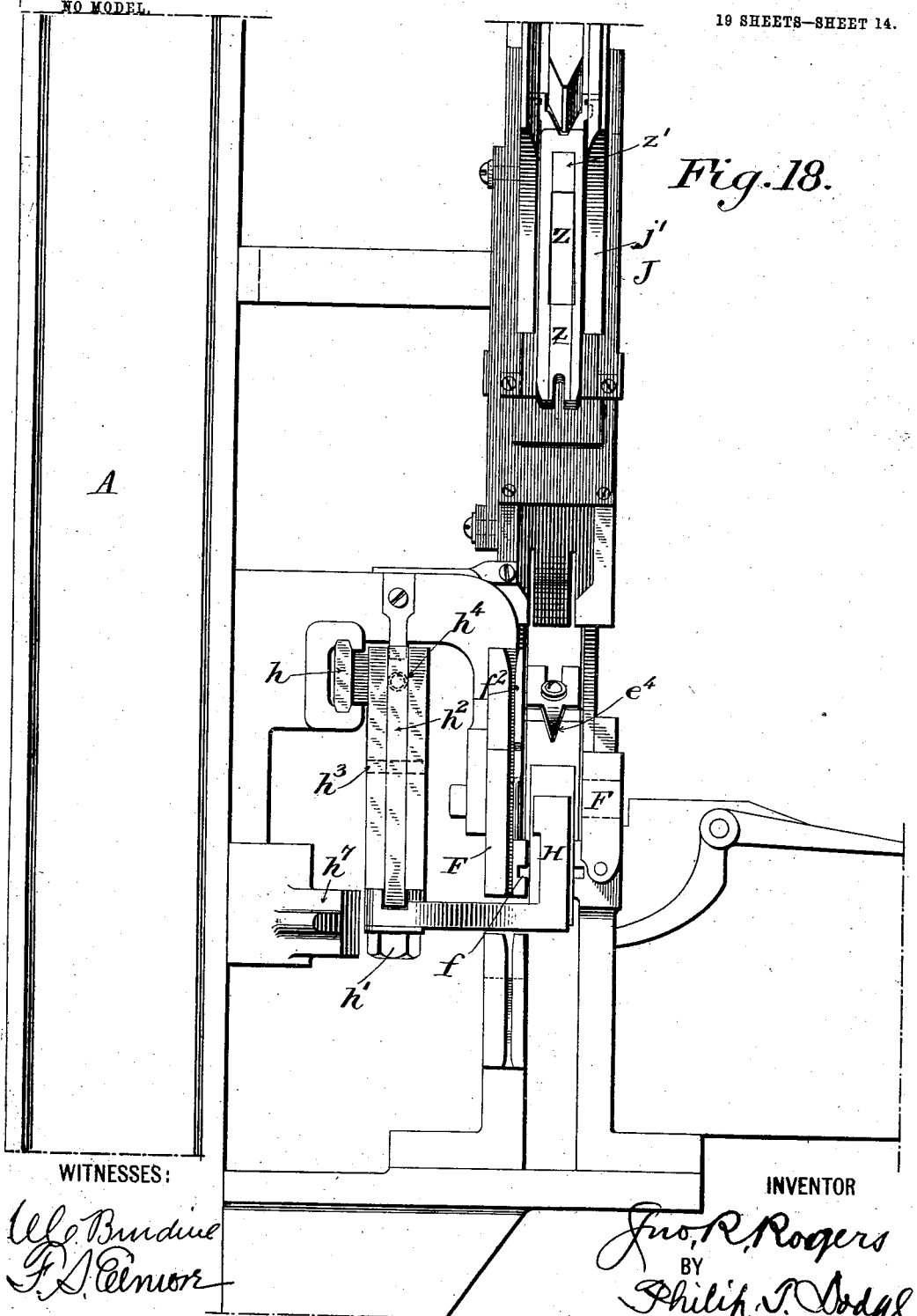

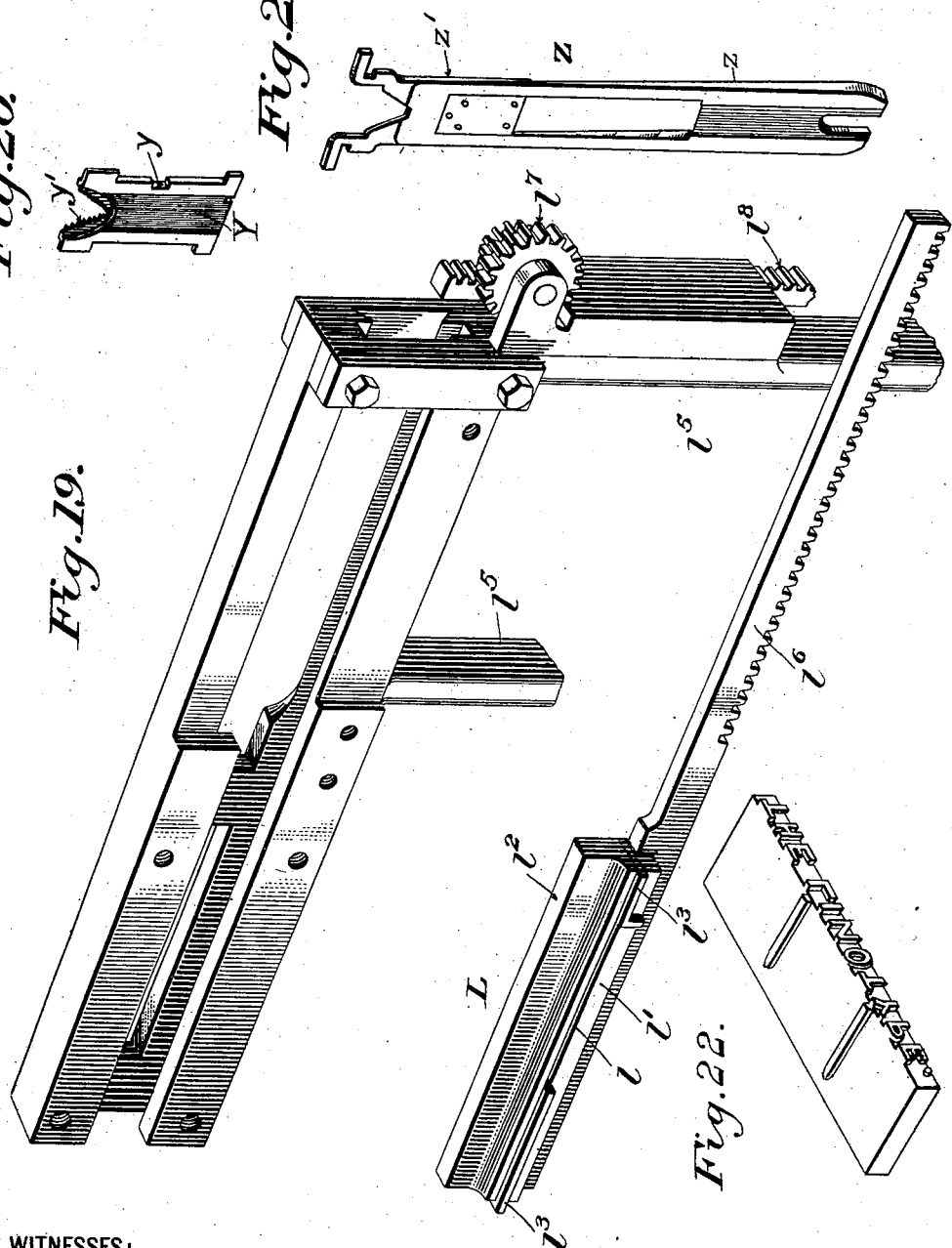

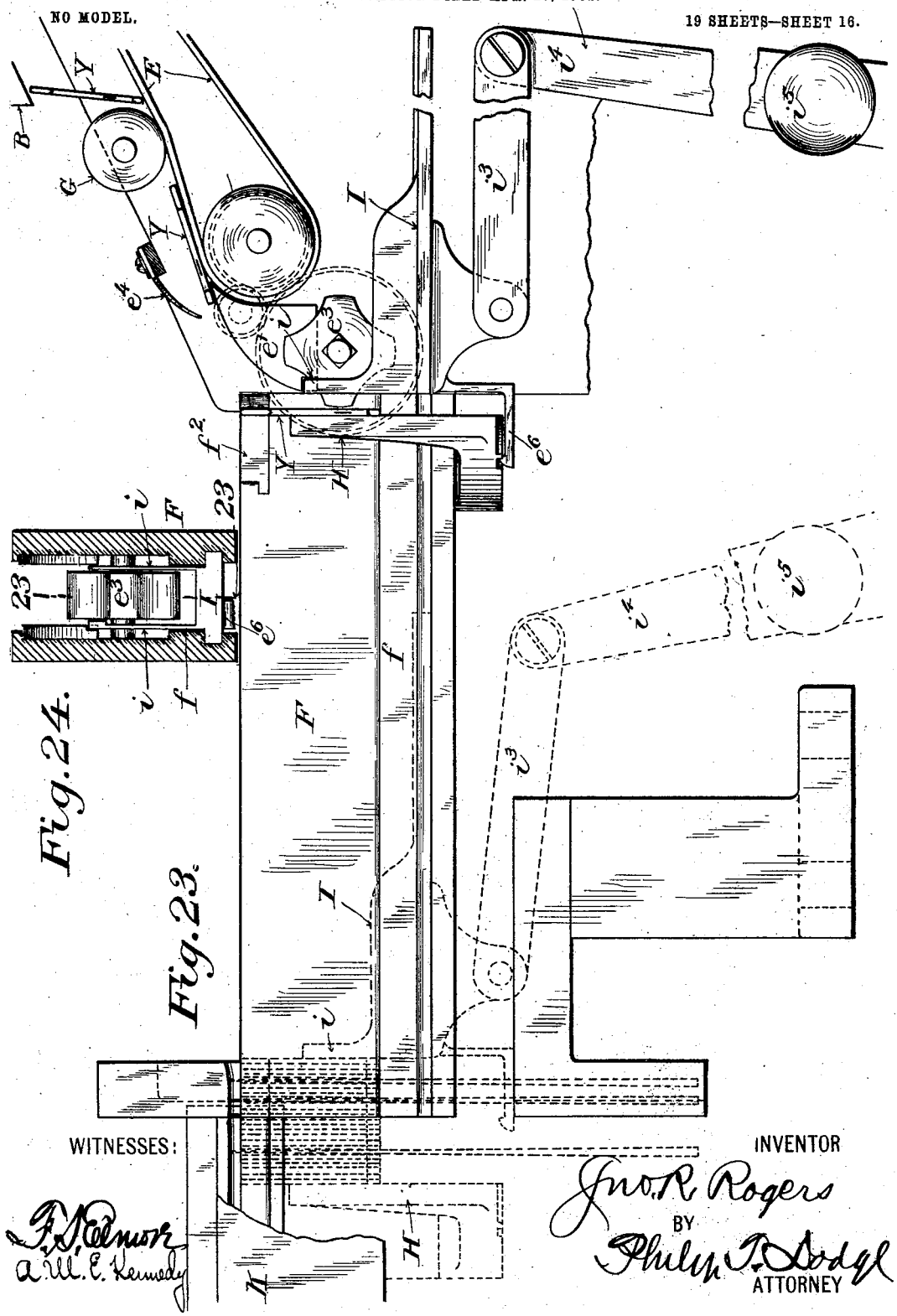

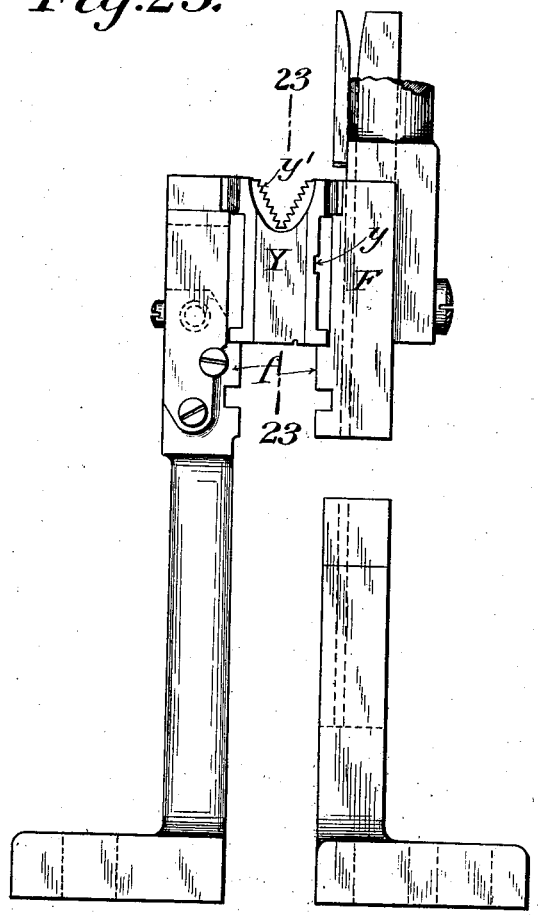

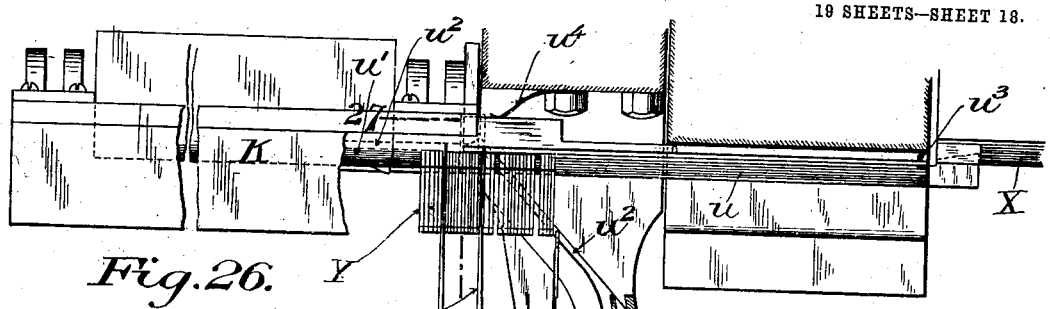
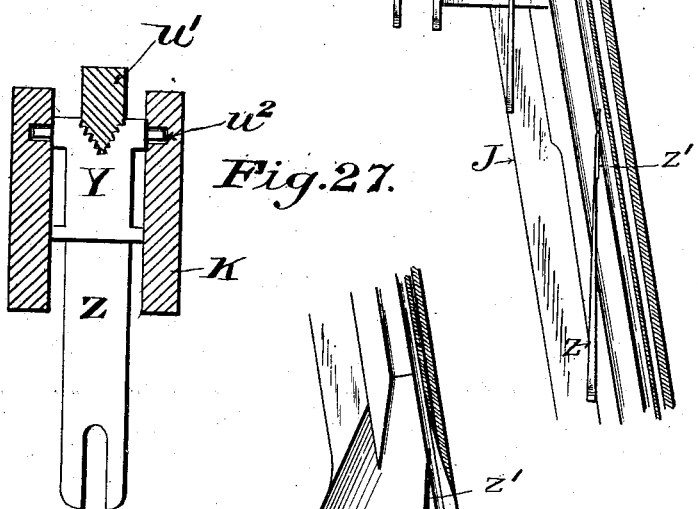
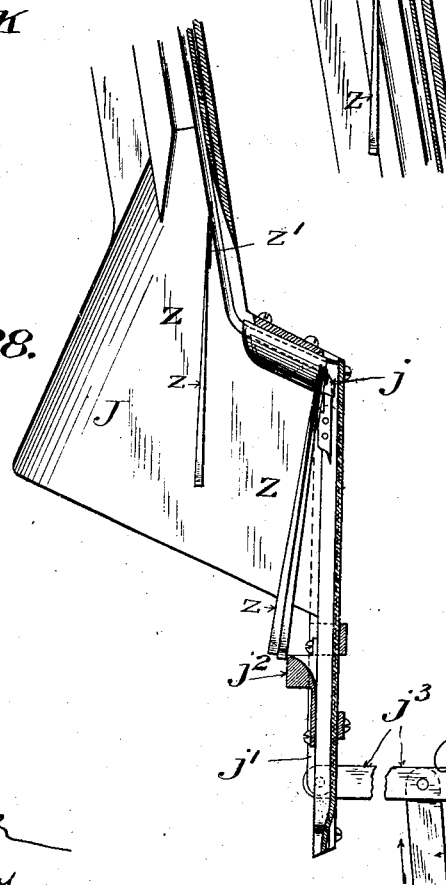

No. 734,096. PATENTED JULY 21, 1903.
J. R. ROGERS.
LINOTYPE MACHINE.
APPLICATION FILED APR. 26, 1901.
NO MODEL. 19 SHEETS—SHEET 19.
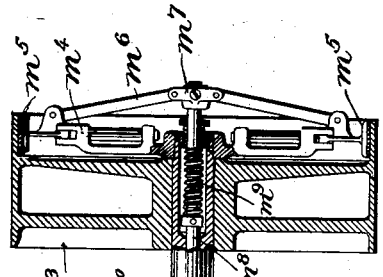
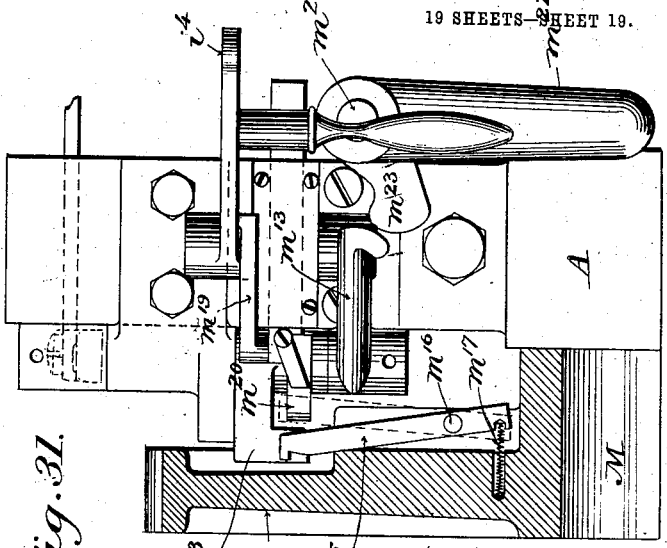
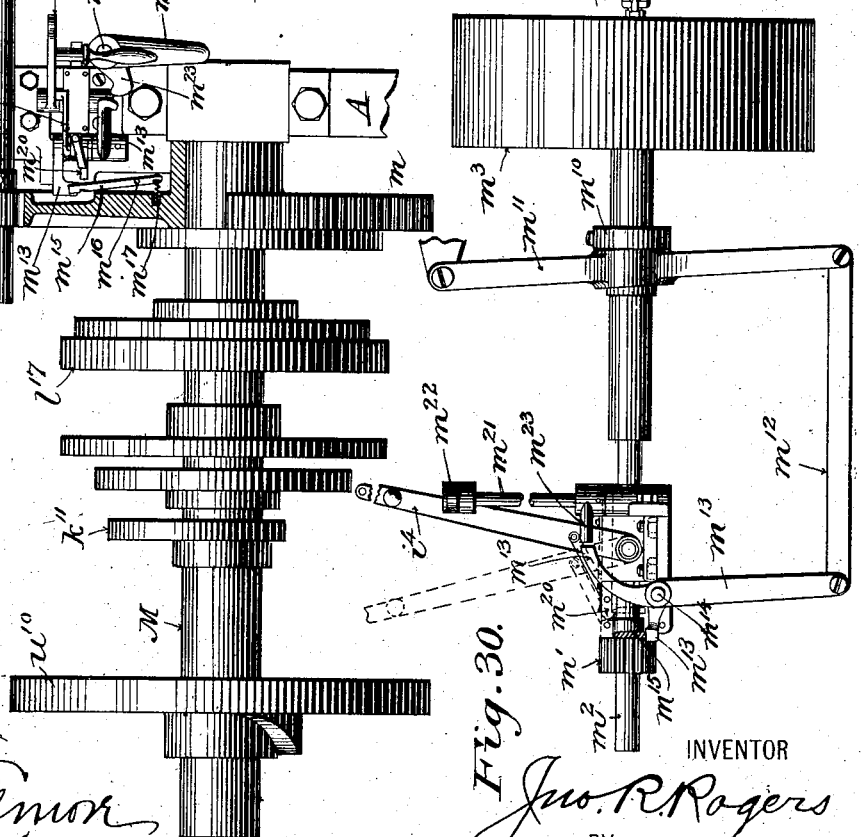
WITNESSES:
F. S. Elmore
N. R. Kennedy
INVENTOR
Jno. R. Rogers
BY
Philip T. Dodge
ATTORNEY No. 734,096. Patented July 21, 1903.

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINOTYPE-MACHINE.

SPECIFICATION forming part of Letters Patent No. 734,096, dated July 21, 1903.

Application filed April 26, 1901. Serial No. 57,561. (No model.)

*To all whom it may concern:*

Be it known that I, JOHN R. ROGERS, of Brooklyn, county of Kings, and State of New York, have invented a new and useful Improvement in Linotype-Machines, of which the following is a specification.

My invention has reference to linotype-machines, in which metal matrices which contain a single letter or two letters to be independently used are held in reserve in a magazine delivered singly together with suitable spacers by the action of finger-keys representing the various characters assembled in line, the line transferred to the face of a slotted mold, the mold filled with molten metal to produce the linotype, and the matrices finally returned to the magazine from which they started.

The object of the invention is to produce a machine of this character which is compact in form, cheap in construction, and of such character and simplicity that it may be safely left under the control of the ordinary compositor inexpert in mechanical matters.

To this end the invention consists in the special construction and arrangement of the various parts and combinations hereinafter described in detail.

Figure 1:
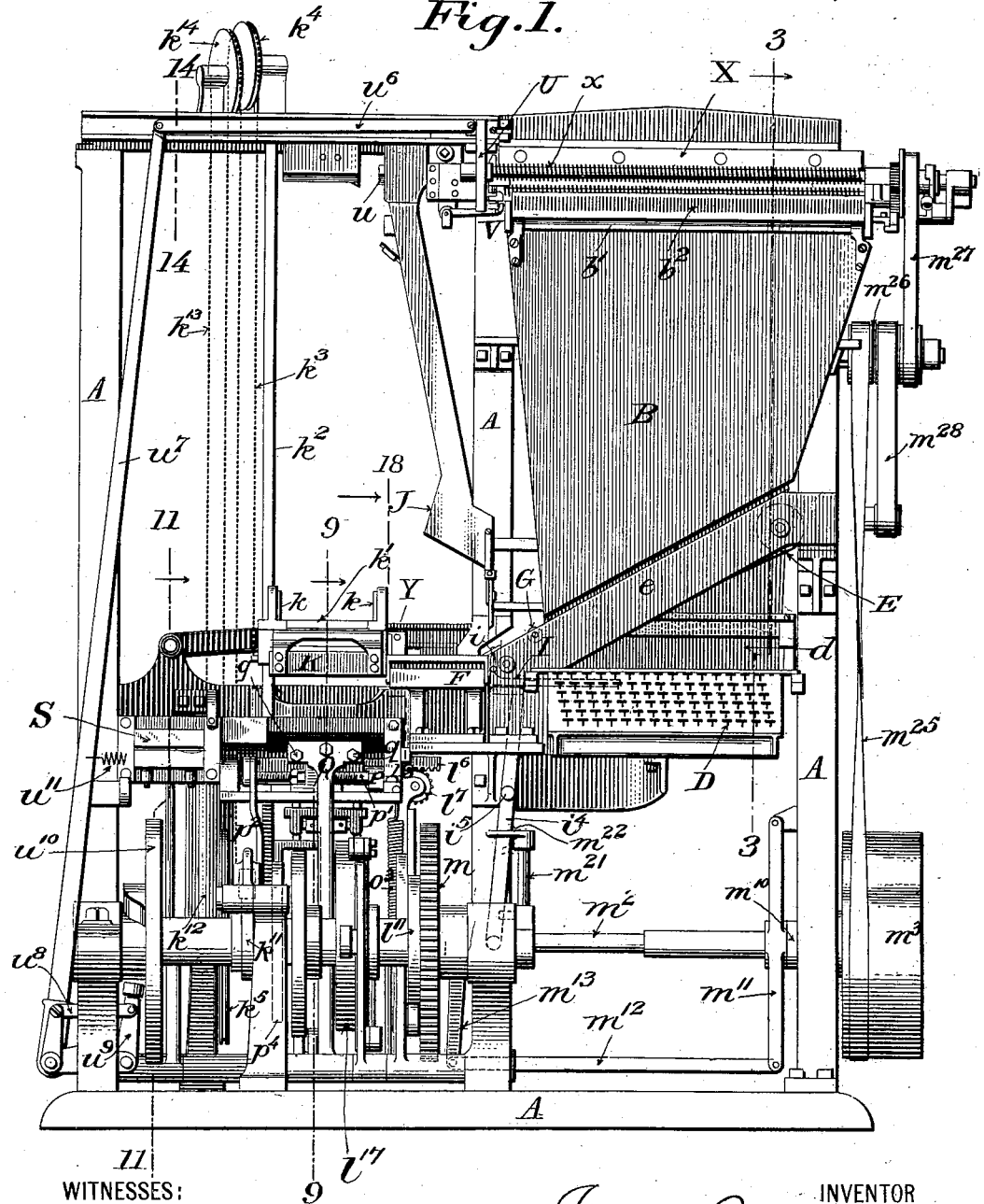
Figure 2:
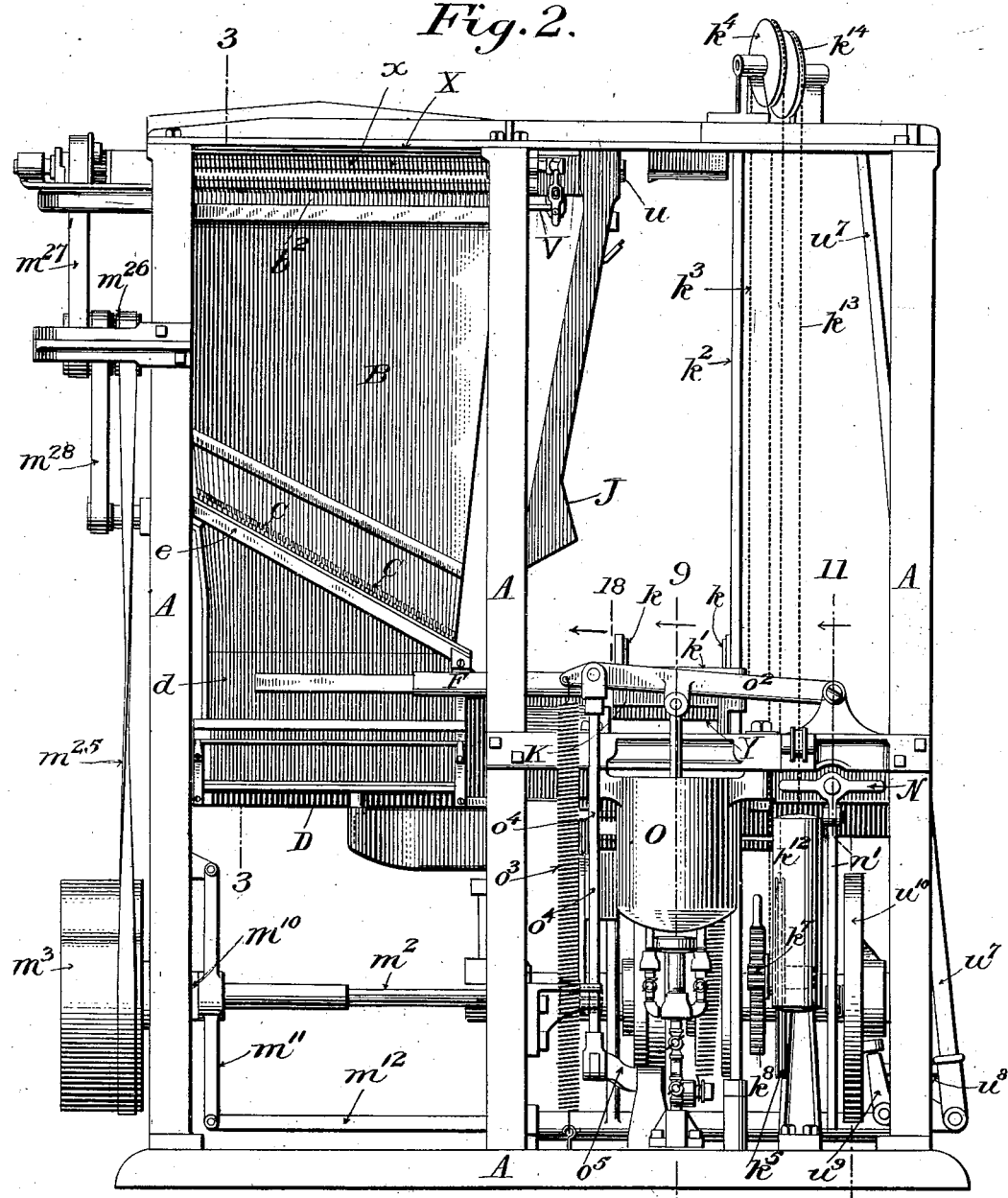
Figure 10:
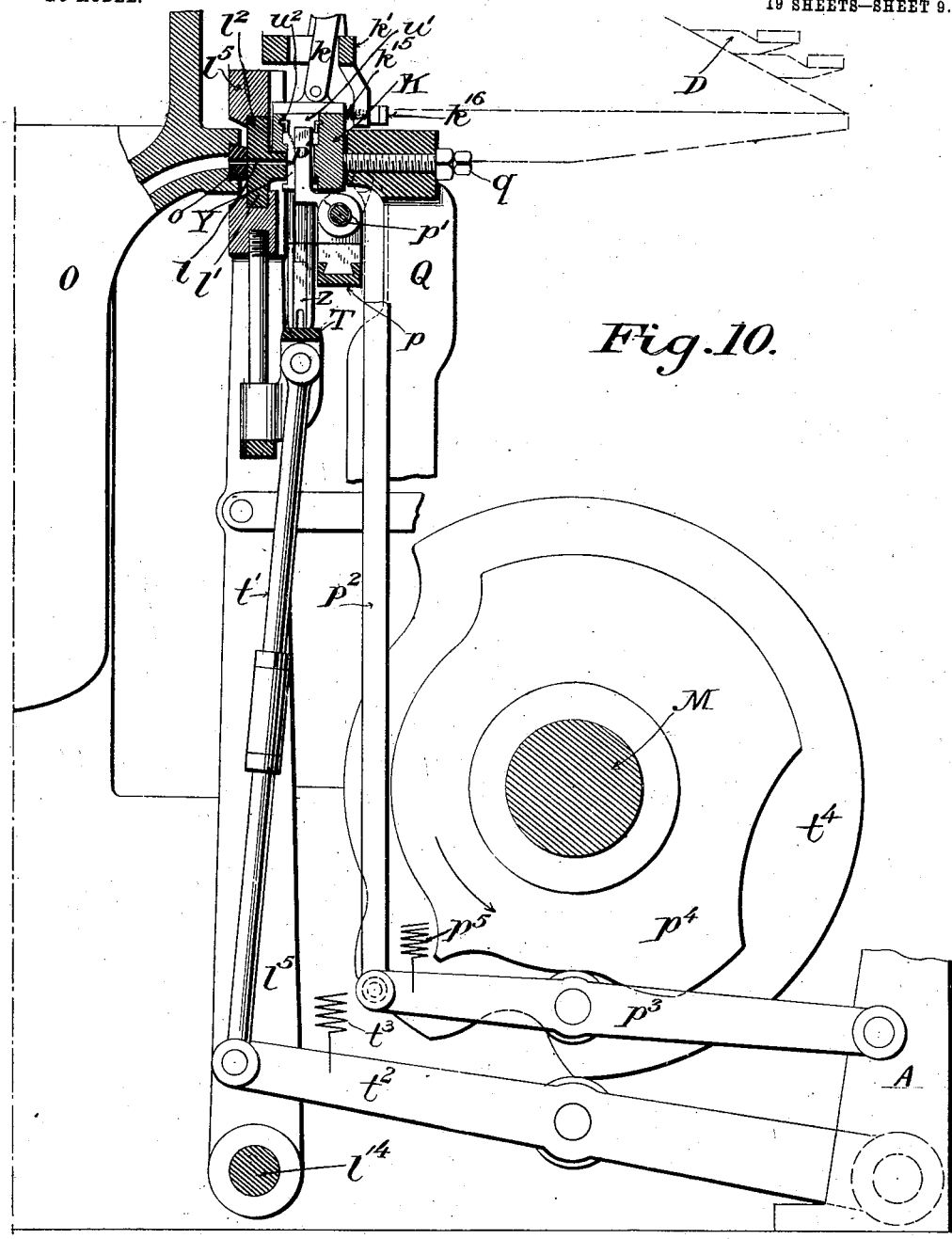
Figure 11:
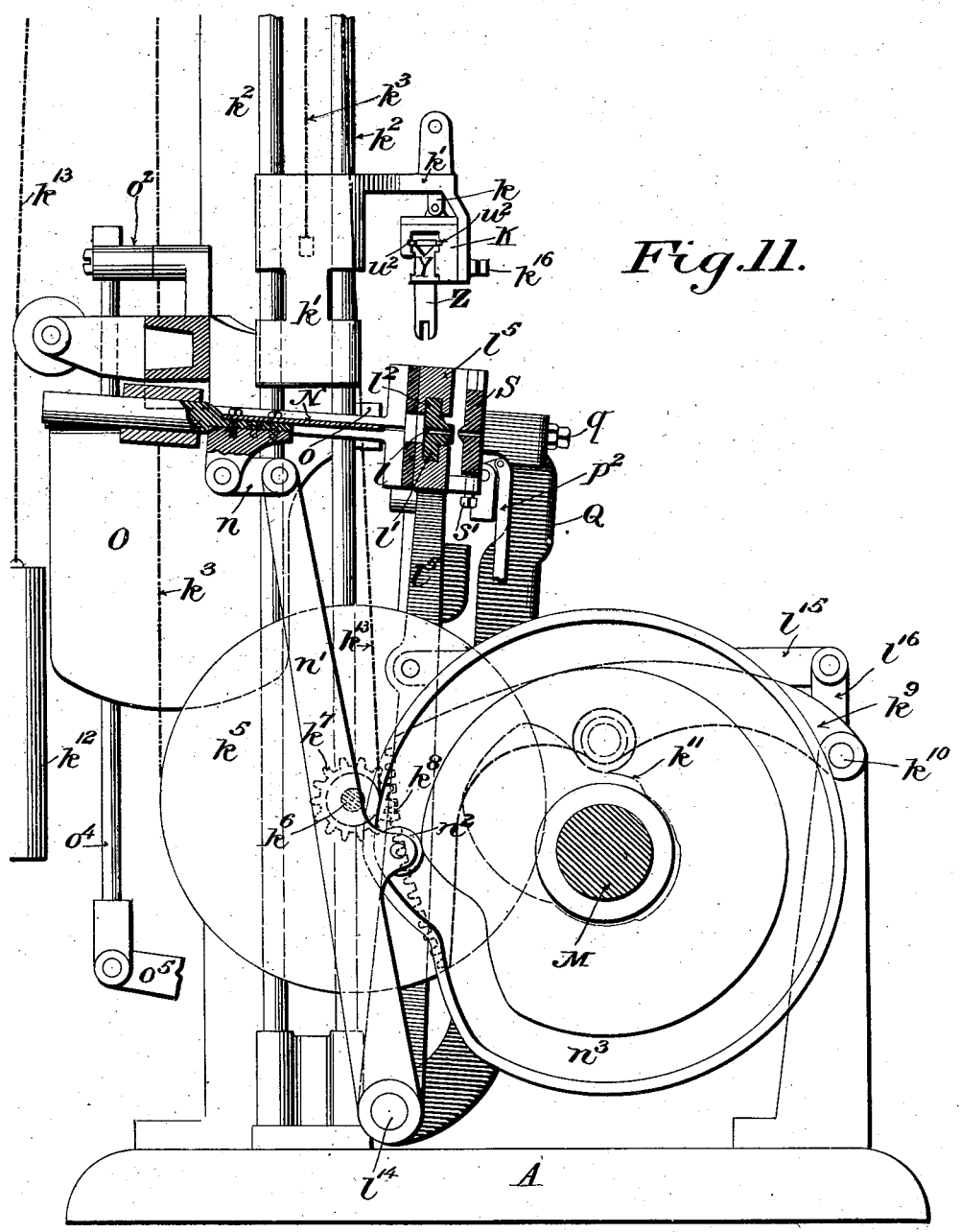

Figure 1 is a front elevation of the machine; Fig. 2, a rear elevation of the same; Fig. 3, a vertical section from front to rear on the line 3 3 of Figs. 1 and 2; Fig. 4, a vertical section through the lower part of the magazine with the escapement thereunder on the same line as Fig. 3, but looking in the opposite direction; Fig. 4ª, a horizontal section through the magazine on the correspondingly-numbered line of Fig. 4. Fig. 5 is a perspective view of the casting mechanism, including the pot, the matrix-clamping device, the mold, and the ejecting devices. Fig. 6 is a perspective view of the knives employed for trimming the slugs to thickness. Fig. 7 is a horizontal section on the line 7 7 of Figs. 9, &c., looking in a downward direction, showing more particularly the casting and ejecting mechanisms. Fig. 8 is a front elevation of the parts represented in the preceding figure, portions being broken away at the front to expose other parts to view. Fig. 9 is a vertical cross-section from front to rear through the casting mechanism on the line 9 9 of Figs. 1, 2, 5, 7, 8, &c., the pot, mold, and clamping devices being separated as they are during the period between the casting operations. Fig. 10 is a similar section with the parts in their operative positions and on a larger scale, portions of the framework and other parts being broken away to more fully disclose the remaining parts. Fig. 11 is a vertical section from front to rear through the ejecting and trimming devices on the line 11 11 of Figs. 1, 2, 5, 8, 9, &c. Fig. 12 is a horizontal section on the line 12 12 of Fig. 8 looking in a downward direction, showing more particularly the sustaining and confining devices for the matrix-line. Fig. 13 is a horizontal section on the line 13 13 of Fig. 8 looking in a downward direction. Fig. 13ª is a top plan view of the mold and the rack-bar for operating the same. Fig. 14 is a vertical section from front to rear, the upper part on the line 14 14 of Fig. 1 and the lower part on the line 9 9 of the same figure. Fig. 15 is a perspective view of a portion of the elevator for sustaining the matrices in front of the mold in its elevated position for the delivery of matrices to the distributer. Fig. 16 is a perspective view showing the matrix-elevator and support in its lower position, together with the adjacent end of the assembling devices, from which the matrices are delivered to the elevator, the parts being separated in order to expose their construction to view. Fig. 17 is a perspective view showing the guide or stop for retaining the line of matrices during composition and thereafter releasing the line that it may be delivered to the elevator. Fig. 18 is a view looking toward the right from the correspondingly-numbered line in Fig. 1. Fig. 19 is a perspective view showing the mold, its support, and the actuating devices, the parts being separated in order to expose more clearly their form and construction. Fig. 20 is a perspective view of one of the matrices. Fig. 21 is a perspective view of one of the expanding wedge-spacers. Fig. 22 is a perspective view of the slug or linotype, the product of the machine. Fig. 23 is a longitudinal vertical section through the assembling devices on the correspondingly-numbered line of Figs. 24 and 25. Fig. 24 is a view looking toward the right into the mouth of the assembler, with the star-wheel in the foreground. Fig. 25 is an end elevation of the assembler shown in Fig. 25, in which the matrix-lines are composed or assembled looking toward the left, or, in other words, toward the receiving end. Fig. 26 is a front elevation, partly in section, of the entrance to the distributing mechanism, showing particularly the devices for delivering the space-bands from the line of matrices previous to the distribution of the latter. Fig. 27 is a cross-section on the correspondingly-numbered line of the preceding figure. Fig. 28 is a vertical cross-section from right to left through the magazine for the spacers or justifiers. Fig. 29 is a plan view of the main shaft, its cams, and the driving connections, certain of the parts being shown in section. Fig. 30 is a front elevation of the main driving-pulley and its clutch connections. Fig. 31 is a horizontal section through the main driving-gear on the main shaft and the attendant clutch-controlling devices, the view being taken on the same line as Fig. 29, but on a larger scale.

The machine in the form shown in the accompanying drawings is adapted to use matrices and expansible wedge-spacers, essentially such as are shown in the Mergenthaler patent, No. 436,532, and in Figs. 20 and 21 of the accompanying drawings. Each matrix Y consists, as shown in Fig. 20, of a flat metallic plate having vertical edges with protruding shoulders at the upper and lower ends, with the female character or matrix proper, $y$, in one edge. The upper edge has a central notch, the edges of which are provided with teeth $y'$ to coöperate with the distributing devices through which the matrices are returned to their proper places in the magazine, as fully explained in Patent No. 347,629. Matrices bearing the same character have like arrangements of teeth, and matrices bearing different characters differ in the arrangement of teeth either as to their number or relative position, or both. There are used in the machine a number of matrices of each character, several hundred in all.

The expansible spacing devices Z for effecting the elongation or justification of the composed lines of matrices consist each of a long tapered wedge $z$, connected by a sliding joint to the shorter wedge $z'$, having ears or shoulders, by which it is suspended and held in position in the line against vertical motion. The opposite faces of the two wedges are parallel, so that when the small wedge is held fast in the line and the longer wedge pushed upward past its side the space will increase in thickness at the operative point, while its outer faces remain parallel, as explained in Patents Nos. 345,526 and 474,306. From fifteen to thirty of these spacers may be advantageously used in each machine.

Referring now to the machine, A represents the rigid main frame, which may be constructed in any form and manner, provided it is adapted to support the various operative parts hereinafter described.

B represents the fixed vertical magazine in which the matrices are held. It consists of two parallel plates having in their opposing faces upright grooves adapted to receive and guide the ears of the matrices, which are introduced at the top and descend by gravity between the plates, as shown in Figs. 3, 4, and 4ª, matrices bearing the same character standing one on top of another in an upright column, as shown. Near the lower end the magazine is provided on the back with a series of escapements C, one for each column of matrices, designed to permit the escape of the matrices one at a time, that they may pass from the magazine to the devices for assembling them in line. Each escapement consists of an angular lever mounted on a central pivot $c$ and carrying at its two ends pawls or dogs $c'$ and $c^2$, which project through the back plate of the magazine. As the escapement-lever is vibrated the two pawls are projected alternately into the path of the matrices. The spring $c^3$, bearing at one end on the escapement-lever and secured at the opposite end to a bar on the magazine, holds the pawls normally in the position shown in Fig. 4, with the lower pawl projected into the magazine, so as to support the lowermost matrix. Each escapement-lever stands over the end of an upright actuating-bar $d$, suitably guided in the frame and engaged at its lower end by the rear end of the finger-key lever D, pivoted at $d'$. When the finger-key is depressed, the bar $d$ reverses the position of the escapement, withdrawing the lower pawl $c'$ and allowing the bottom matrix to fall out of the magazine, while at the same time the upper pawl is projected and the escape of the next matrix prevented, although it is permitted to descend until its upper shoulder is arrested by the upper pawl. When the finger-key is released, the spring $c^3$ restores the escapement to its original position, allowing the second matrix, which has now become the first, to descend to the position previously occupied by its predecessor. Thus it will be seen that each operation of the finger-key is followed by the discharge of a single matrix. The series of keys representing the various characters enable the operator to discharge matrices bearing corresponding characters in the required order. The lower end of the magazine is preferably formed with a downward inclination toward the left—that is, toward the assembling devices—first, for the purpose of giving long channels, and, second, for the purpose of reducing as much as possible the distances between the assembling devices and the points at which the matrices leave the magazine to lessen the danger of transpositions when the machine is operated at high speed.

The upper end of the magazine is provided with a mouth or entrance $b$, connected thereto by a horizontal hinge-pin $b'$ at the front. This mouthpiece stands directly under the distributer-bar X, from which the matrices fall, as hereinafter described, and is divided by a series of vertical transverse partition-plates $b^2$, lying in lines between the channels of the magazine, so that the matrices passing between the partition-plates are kept in an upright position and guided into the magazine-channels. It will be observed that these partitions extend forward beyond the front of the magazine, forming with their front walls pockets, so that if for any reason matrices lodge in the mouthpiece instead of falling into the magazine-channels it is only necessary to tip the mouthpiece forward, whereupon the matrices will fall into the pockets, from which they may be readily removed.

E is an inclined constantly-running belt, supported on pulleys between side plates $e$, directly under the mouth of the magazine, so that the matrices discharged therefrom are received on the belt and carried rapidly downward to the left into the stationary assembler F, in which they are received successively and assembled in line side by side. This assembler, as shown in Figs. 1, 22, 23, &c., is simply a casting having a horizontal groove or channel through its upper end from right to left, with horizontal shoulders $f$ therein to sustain the matrices, as specially shown in Figs. 20, 23, and 24. Near its lower end the carrier-belt E is carried beneath a rubber wheel or roll G, which serves to keep the matrices down in place thereon and to prevent them from overshooting the end of the belt. Each matrix leaving the end of the belt is received upon and guided by the underlying inclined surface $e'$, whereby the matrix is guided downward into the end of the assembler and caused to assume an upright position. As each matrix in an upright position approaches the end of the assembler it comes within the path of the revolving star-wheel or cam $e^3$, whereby it is pushed forward horizontally into the end of the assembler and into the grasp of the usual retaining dogs or pawls $f^2$. The star-wheel serves not only to push forward each matrix, but to advance the entire line as it elongates, thus leaving room for the entrance of the following matrices.

In order more effectually to guide the ingoing matrices and prevent them from being projected over those already in the line in the event of their leaving the belt by reason of their velocity, a stationary finger $e^4$ is preferably mounted over the lower end of the belt, as shown. It is advisable to make this finger of elastic material.

During the progress of composition the spacing-wedges or spacers Z must be inserted in the line between the words. To this end they are suspended in series in their stationary magazine or holder J, overlying the assembler, so that the spacers released from the magazine are permitted to fall one at a time into the assembler F between the preceding matrix and the star-wheel. The magazine for the spacers consists, essentially, of two upright parallel side plates having their upper edges provided with inclined grooves to receive and sustain the ears of the spacers which descend to this magazine from the distributing-magazine above, as hereinafter explained. The foremost spacer in the series is held in the magazine by upright shoulders $j$ on the side walls, and the spacers are released one at a time by vertically-movable fingers $j'$, which engage under the ears of the foremost spacer in order to lift the same and permit the ears to pass over the detaining-shoulders, whereupon the spacer is free to descend through the chute or guide to the line below, as above explained. The mechanism for delivering the spacers is essentially the same as that used in the present Mergenthaler machines and is not broadly claimed herein. In order to prevent the lower ends of the spacers which are held in reserve from swinging forward into the path of the descending spacer, the magazine is provided at the bottom with a lip or shoulder $j^2$, as shown in Fig. 28, against which the lower end of the forward spacer bears. The space-delivering fingers $j'$ are actuated by a lever $j^3$, (see Fig. 28,) actuated by a link $j^4$, which will be connected with one of the finger-keys.

As the line of matrices and spacers elongates in the course of composition its advance is opposed and the series of matrices held in compact order by the upright resisting-finger H, extending downward and rearward beyond the assembler and carried by a horizontal slide $h$, mounted in the main frame, this arrangement permitting the finger to move horizontally in advance of the line. When the line is completed, it must be transferred bodily to the left beyond the finger H for purposes hereinafter explained. In order, therefore, that the finger may be removed from the path of the matrices, it is connected to the supporting-slide $h$, as shown in Figs. 12, 16, 17, and 18, by a vertical pivot $h'$ and held normally in its operative position by an upright latch $h^2$, pivoted to the slide at $h^3$. An internal spring $h^4$ keeps the latch normally in engagement with the detent-finger, as shown in Fig. 18, so that the finger is ordinarily locked rigidly to the supporting-slide. When, however, the slide is advanced to an extreme position to the left, a stationary pin $h^5$ on the frame (see Figs. 16 and 17) encounters the upper end of the latch, disengaging it from the resistant H and permitting the latter to swing back from its operative position (shown in Figs. 16 and 18 and in dotted lines in Fig. 17) to the inactive position. (Shown in full lines in Figs. 12 and 17.) In the last-named position the detent is beyond the path of the matrices, allowing the composed line of matrices and spacers to be carried horizontally past the resistant out of the assembler to the devices beyond, as presently explained.

A spring $h^6$ (see Fig. 12) tends to return the resistant H and its supporting-slide to the right after the matrices have been delivered from the assembler. As the assembler returns toward its first position adjacent to the assembling-wheel it encounters a fixed surface $h^7$, as shown in dotted lines in Fig. 12, whereby the finger is swung around to its operative position, so that it may be locked by the latch $h^2$.

In order to effect the horizontal delivery of the composed line from the assembler F, as above indicated, I provide a second horizontal slide I, having at one end the two upright fingers $i$ to act behind the matrix-line, as shown in Fig. 16. During the composition of the line the fingers $i$ stand at rest on opposite sides of the assembler-wheel $e^3$, as shown in Figs. 23 and 24. This transfer-slide I is actuated, as shown in Fig. 23, by a link $i^3$, connecting it to the upper end of a lever $i^4$, pivoted to the main frame, as shown in Figs. 1 and 23. This lever serves the double purpose of shifting the line and of setting in motion the parts other than the assembling devices and is provided with a knob or handle $i^5$, through which it is operated by the attendant. It will be understood that the line of matrices and spacers is assembled between the resistant H and the fingers $i$ and that when the lever $i^4$ is moved by hand to the left it causes the fingers on the slide I to push the matrix-line forward through and beyond the assembler, as indicated by dotted lines in Fig. 23, the completion of the movement being accompanied by the unlocking of the resistant H, so that the matrices may pass it, as before explained.

In order to insure the restoration of the resistant H to its operative position, or, in other words, to swing it back on its pivot to the operative position, so that the latch will be sure to lock it in the event of the shoulder $h^7$ failing to operate properly, the slide I is provided at the left hand, under its rear side, as shown in Fig. 23, with a spring latch or finger $e^6$, which at the completion of the transfer movement engages the lower end of the dog, so that when the slide I is retracted toward the right the latch swings the resistant around in position to be secured by its latch. It also insures the return movement of the resistant to the right end of the assembler preparatory to the composition of the next line in the event of spring $h^6$ failing to act. It will be understood that this latch, which lies behind the edges of the spacers and below the matrices, is in position to engage the hub or central portion of the swinging resistant H when the latter is back out of the path of the matrices. As the resistant reaches its operative position its lower end passes out of engagement with latch $e^6$. The matrix-line on being pushed to the left out of the assembler is received in an elevator or yoke K. (See Figs. 1, 7, 8, 9, 11, 12, 13, 14, and 16.) This elevator consists of two horizontal arms connected at one end, the space between them being of suitable width to receive the composed line and the inner surfaces being shouldered to sustain the matrices and the short members of the spacers. The composed line is suspended in the elevator, as plainly shown in Fig. 14, the rear face of the elevator being cut away, so that the operative edges of the matrices and the characters therein are exposed for presentation to the mold L, with which they are to coöperate, as hereinafter explained.

The elevator K is suspended by links $k$ within a frame or carrier $k'$, mounted to slide vertically on guides $k^2$, this arrangement permitting the elevator to first lower the line from the receiving-level to the level of the mold below and thereafter to lift the line above its original level to the distributing devices at the top of the machine. This vertical movement of the elevator may be effected by any appropriate mechanism; but I prefer to employ the arrangement shown in detail in Fig. 14 and also in Figs. 1 and 2, in which $k^3$ represents a lifting-chain extending from the elevator over the guide-pulley $k^4$ and downward to the winding-drum $k^5$ on a shaft $k^6$, carrying the pinion $k^7$, which receives motion from the sector-rack $k^8$ on the end of lever $k^9$, which is pivoted to the frame at $k^{10}$ and acted upon at the middle by cam $k^{11}$ on the main shaft M. The drum $k^5$, receiving motion from the cam and intermediate parts, winds and unwinds the chain, which raises and lowers the elevator with the contained line of matrices.

In order to relieve the parts from strain and ease their action, I recommend the employment of a counterbalancing-weight $k^{12}$, attached to a chain $k^{13}$, passing over a guide-pulley $k^{14}$ and thence downward to a drum on the shaft $k^6$ or on the side of the larger drum $k^5$. It will be remembered that the elevator K is suspended in its supporting slide or frame by links. This arrangement is important in that it leaves the elevator freely suspended, so that it may tip or rock horizontally in order that the matrices in the line may adjust themselves freely and tightly to the face of the mold when they are presented thereto. Heretofore it has been customary to sustain the support for the matrix-line and the mold solidly or by devices which were supposed to keep them exactly parallel. In practice it has been found exceedingly difficult to maintain this parallelism of the parts, and therefore it is that I have for the first time arranged the matrix-support to move with freedom, or, in other words, to be self-adjusting, and this feature I claim, broadly, irrespective of the peculiar means or devices employed, it being obvious that the links $k$ may be replaced by any mechanical equivalent.

For the purpose of holding the matrices away from the mold when not in action I propose to mount behind the elevator K, as shown in Fig. 14 and elsewhere, in the frame $k'$ tension-springs $k^{15}$, using adjusting-screws $k^{16}$ behind the same, if desired.

The mold L, in which the slugs or linotypes are cast, is in the form of an elongated body having a horizontal slot or opening $l$ therethrough from one side to the other of the exact dimensions of the required slug or linotype. The mold may be made in one piece; but it is preferably built up of a base portion $l'$, an overlying cap $l^2$, and intermediate liners or spacing-pieces $l^3$, which determine the distance between the two body members and also the length of the slot or mold proper, so that by the substitution of liners of different lengths and thicknesses the slot may be varied in dimensions to produce linotypes differing in "body" and measure.

The mold is mounted to slide horizontally in a guiding-frame $l^5$, such as shown in Fig. 19, so that it may be moved from its operative position between the matrix-line and the melting-pot toward the left to a position in front of the horizontal ejector-blade N, by which the slug or linotype is driven out of the mold. The mold is provided with a long rack-bar $l^6$ and is actuated by a pinion $l^7$, engaging this rack and receiving motion in its turn, as shown in Figs. 7, 8, 9, 19, &c., from the vertical rack-bar $l^8$. The last-named bar is connected, as in Fig. 9, by link $l^9$ to lever $l^{10}$, pivoted at one end to the main frame and acted upon at the middle by a cam $l^{11}$. The cam acting through the intermediate parts forces the mold to the left from the casting position to the position for the delivery of the slug. Its return movement is effected by a lifting-spring $l^{12}$, attached to the frame and connected to the end of the lever $l^{10}$.

The mold-guiding frame $l^5$ is constructed with downwardly-extending legs mounted, as shown in Figs. 9, 10, &c., on a horizontal axis $l^{14}$, this arrangement permitting the mold to swing to and from the mouth of the stationary melting-pot O and also to and from the line of matrices on the opposite side. This forward-and-backward movement of the mold is effected, as shown in Fig. 9, by a link $l^{15}$, extending from the mold-supporting guide $l^5$ to the lever $l^{16}$, which is pivoted at its lower end in the main frame and acted upon at its middle by the periphery of the cam $l^{17}$, mounted on the main shaft. This cam acts, as will be seen, to withdraw the mold positively from the mouth of the pot in order to break the base of the slug contained in the mold away from the "sprues," so called, in the mouth of the pot.

The melting-pot O, which may be of any suitable form and heated either by gas, as usual, or in any other suitable manner, is fixed to the main frame and constructed with a delivery mouth or throat having a flat perforated face $o$ (see Figs. 9 and 10) to fit tightly against the rear face of the mold, as shown in Fig. 10. The pot will be provided, as usual, with an internal well or cylinder (see Fig. 9) containing a plunger $o'$, by which the delivery of the molten metal is effected through the mouth into the mold L, as usual in this class of machines.

The plunger $o'$ receives motion through lever $o^2$, pivoted at one end to the frame, as shown in Fig. 2, and acted upon at the opposite end by a depressing-spring $o^3$ and by a lifting-rod $o^4$, the latter being connected, as shown in Figs. 2 and 9, to lever $o^5$, mounted on a central pivot $o^6$ in the main frame and acted upon at its rear end by a depressing-cam $o^7$.

It will be understood that the elevator K after receiving the composed line lowers the same to a position in front of the mold, which at this time stands in front of the pot, so that when the elevator is crowded rearward, as hereinafter explained, the matrices are forced against the front of and caused to close the mold, while at the same time the mold has its rear face crowded against the mouth of the pot, so as to form a close union therewith and prevent the leakage of the molten metal between them while it is being delivered into the mold.

While the line of matrices stands in front of the mold its justification or elongation to the prescribed limit must be effected by the action of the spacers, and at the same time the line must be confined endwise, that it may not exceed the proper length. This confinement is effected by two jaws or abutments P and P', sustained by a dovetailed guide $p$ or equivalent support mounted on the mold-guiding frame $l^5$, as plainly shown in Figs. 5, 10, &c. The upper ends of these abutments stand in such position that the composed line will be lowered between them by the elevator, as plainly represented in Figs. 7, 10, and 13. The right-hand jaw P is fixed in position; but the jaw P' is movable horizontally toward its companion under the influence of a horizontal screw $p'$, extended loosely through the jaw, threaded at one end into the frame, and carrying nuts $p^6$ to support the jaw. The screw has on one end a crank-arm connected by rod $p^2$, as shown in Figs. 5 and 10, to lever $p^3$, depressed at intervals by cam $p^4$ on the main shaft and released by spring $p^5$. The cam acts to turn the screw and release the jaw or abutment P', so that it may recede from its companion preparatory to the admission of the matrix-line from above, and also after the casting operation to release the matrix-line, that it may be readily lifted from between the jaws or abutments. It will be understood that the jaw P' has only a slight receding movement and that this will occur under the influence of the matrix-line as it expands or as it is lowered between the jaws or abutments, which are rounded on their upper inner corners.

During the casting action the cam permits the spring to turn the screw, so as to close the jaw P' toward its companion, the distance between the two jaws being at this time precisely equal to the length of the mold-slot and to the length of the slug or linotype to be produced.

To facilitate the exact alinement of the matrices when they are being crowded against the mold and after the first justification action, the cam $p^4$ is preferably constructed to slightly retract the abutment P' for the moment in order to reduce the friction between the matrices and between the matrices and space-bands that the alinement may be more easily effected.

In order to force the matrix support or elevator K rearward previous to the casting action, so that the matrices may bear tightly against the mold and that the latter may in turn bear tightly against the pot, I provide a pressure mechanism consisting, as shown more particularly in Figs. 7, 9, 10, 11, &c., of an upright frame Q, arranged to swing on the horizontal axis $l^{14}$ at the bottom and having at the top one or more screws $q$ to act against the outer face of the elevator K when the latter is in its lower position. This pressure-frame Q is provided with a stud or roller $q'$, entering a cam-groove $q^2$ in the side of a cam in the main shaft M, this groove being so formed as to move the frame Q forward and backward at the proper times, as hereinafter more fully explained.

At the time the matrix-line is lowered from the assembling-level the pressure-frame Q stands back away from the path of the descending elevator and the elevator descends between the pressure-frame and the position occupied by the mold.

After the mold is in position in front of the pot the pressure-frame swings rearward, acting against the elevator K and crowding it strongly rearward against the mold, which, with its supporting-frame, swings rearward until the mold bears against the pot-mouth, as shown in Fig. 10. The to-and-fro motion of the matrix-line is permitted by the links suspending the elevator K, so that when the parts again swing forward the matrices may retreat from the face of the mold and from the type characters on the edge of the slug formed in the mold.

After the casting operation is complete and the parts have separated the mold slides to the left, as before described, until it stands directly in front of the ejector-blade N, which is guided in grooved arms rigidly attached to the vibratory mold-guiding frame $l^5$, as shown more particularly in Figs. 5, 7, and 11. This connection of the ejector-guide to the mold-support insures an exact alinement of the blade to the mold and avoids the serious dangers which would result from the ejector, which is of hard metal, getting out of alinement with the mold, so as to come in contact with its rear edge. This blade is detachably secured to a carrier connected by link $n$ to the upper end of lever $n'$, which is mounted at its lower end on the horizontal pivot $l^{14}$ and provided near its middle with a laterally-projecting roller $n^2$, seated in a cam-groove $n^3$ in the side of a cam on the main shaft, this groove being of such form that when the mold stands at rest in front of the ejector the blade is driven forward, so as to carry the slug out of the mold and forward between the trimming-knives S, after which the blade is instantly retracted and caused to remain at rest until the next slug is presented for ejection.

The knives S, having parallel edges adapted to trim the side faces of the slug in its passage between them, are secured together, as shown in Fig. 6, and seated at their ends in grooves $s$ in the main frame, so that they may be readily lifted out and replaced by others having a different distance between them to trim slugs of a different thickness. The vertical adjustment of the knives may be effected by screws $s'$ (see Figs. 5 and 11) in order to bring them into exact alinement with the mold, so that the slug will be accurately guided between them by the mold.

After the casting operation and after the matrices have been withdrawn from the face of the mold and the front edge of the slug by the backward movement of the elevator K they require to be distributed and returned to the top of the magazine, from which they were originally delivered at the bottom. The first action is to lift the composed line, including the spacers, to the level of the distributing mechanism. This is effected through the raising of the elevator K on the guides $k^2$ through the medium of the chain $k^3$ and the intermediate devices receiving motion from the cam $k''$, heretofore described and clearly illustrated in Fig. 14. The elevator rises to the position shown in dotted lines in Fig. 14 and in full lines in Fig. 26, presenting the matrix-line opposite the end of a horizontal guide-bar $u$, forming a continuation of a bar $u'$ in the elevator, as shown in Figs. 15, 26, and 27. These bars $u$ and $u'$ are toothed longitudinally to engage the distributing-teeth in the upper end of the matrices, so that as the line is pushed forward out of the distributer the matrices will hang in suspension from the bar $u$, while the ears of the spacers, protruding beyond the sides of the matrices, will be sustained in horizontal grooves $u^2$ in the sides of the frame, as shown in Figs. 26 and 27.

In order that the matrices may pass smoothly and freely upon the supporting-guide $u$, the latter is mounted at one end on the horizontal pivot $u^3$, as shown in Fig. 26, and its opposite end adapted to overlap a bar upon the end of the short guide $u'$ in the elevator, so that as the elevator completes its ascent its rail $u'$ will act beneath and support the end of the guide or rail $u$, thus insuring their alinement at the point of connection. The overlying spring $u^4$ tends to press the guide $u$ down in order to insure its close contact with the rail or guide in the distributer.

In order to effect the separation of the spacers Z from the matrices as the latter advance toward the right, the grooves $u^2$, which carry the spacer-ears, are extended toward the right with a downward inclination, so that as the matrix-line advances past this groove the ears of the spacers are caused to travel down therein, whereby the spacers are lowered gradually and successively out of the line and delivered into the guide-tube $j$, through which they descend by gravity to their magazine J. The matrices, continuing their movement to the right along the guide $u$, finally reach the lifting-dog V, by which they are lifted one at a time between the horizontal feed-screws $x$, three in number, as shown in Fig. 3, whereby the matrices are carried along the distributer-bar X. This bar is toothed longitudinally and the teeth varied in number and arrangement at different points in its length and the teeth in the upper ends of the matrices correspondingly varied in number and arrangement, so that the matrices, traveling along the bar and suspended therefrom, are released by the teeth when over their appropriate magazine-channels, so that they fall between the screws into said channels.

The construction of the distributer-bar and the arrangement of teeth in the matrices are essentially such as described in the Mergenthaler Patent No. 347,629 and are not in themselves claimed as part of the present invention.

The matrix-carrier U receives motion, as shown in Fig. 1, from the link $u^6$, connected to the upper end of a lever $u^7$, having its lower end connected through link $u^8$ to lever $u^9$, acted upon by an inclined surface on the side of cam $u^{10}$, whereby the slide is moved outward against the resistance of spring $u^{11}$, whereby the parts are returned and the slide pushed inward to advance the matrices with a yielding pressure as the cam ceases its action.

Motion is communicated to the principal parts of the machine, as shown in Figs. 29, 30, and 31, as follows: The main shaft M has fixed thereon a large gear-wheel $m$, actuated intermittingly by a pinion $m'$, fixed on the horizontal shaft $m^2$, mounted in the main frame. This shaft carries at its outer end a loose driving-pulley $m^3$ and a clutch mechanism, by which this pulley may be coupled to and released from the shaft at will, so that although the pulley $m^3$ is driven continuously the casting and transferring mechanism and other parts dealing with the composed lines (excepting the assembling and distributing devices) will be driven intermittingly. The clutch mechanism is essentially the same as in the ordinary Mergenthaler machine, and consists of a cross-head $m^4$, keyed to the shaft $m^2$ and carrying two outwardly-sliding friction-shoes $m^5$ to engage with the interior of the driving-pulley. These shoes are actuated by links $m^6$, connecting them to a central head $m^7$ on the end of a rod $m^8$, mounted centrally within the shaft $m^2$, but movable endwise therein. This clutch-controlling rod $m^8$ is urged constantly inward by an encircling spring $m^9$, which throws the clutch into action whenever the rod is released. The inner end of the clutch-rod $m^8$ is connected by pins passing through longitudinal slots in the shaft $m^2$ with an external collar $m^{10}$, actuated by a horizontal lever $m^{11}$, pivoted at one end to the main frame, so that when its free end is thrown to the right it will disconnect the clutch and stop the main shaft M. This clutch-controlling lever is operated automatically at the end of each revolution of the main shaft through a link $m^{12}$, connected to an angular lever $m^{13}$, pivoted to the frame at $m^{14}$ and actuated by a pivoted stop-dog $m^{15}$, lying in the side of the gear-wheel $m$ and pivoted thereto at $m^{16}$. A spring $m^{17}$ holds the end of this stop-dog inward toward the gear-wheel and in such position that as the wheel completes its revolution the end of the dog will strike one arm of the lever $m^{13}$, as shown in Fig. 30, thereby moving the lever and causing it in turn to operate the clutch-lever $m^{11}$, and thereby disengage the clutch, which is held out of action. It will be observed that the dog or lever $m^{15}$ serves not only to disengage the clutch, but also through its contact with the lever as a mechanical or positive stop to arrest the main wheel $m$ and prevent it from running forward beyond the proper point by reason of its momentum.

In order to effect the release of the stop-dog, so that the machine-driving clutch may engage automatically under the influence of its spring $m^9$, I mount in the main frame a hand-lever $i^4$, heretofore referred to, known as the "starting-lever," and connected by link $m^{19}$ to a slide carrying a dog or catch $m^{20}$, so that when the lever is thrown to the left to transfer the composed line the latch $m^{20}$ engages over the stop-dog $m^{15}$, and as the starting-lever is returned to its position at the right the latch $m^{20}$ pulls the stop-dog $m^{15}$ out of contact with the laterally-projecting arm of the lever $m^{13}$, which, being released, permits the machine-clutch to engage automatically. The clutch immediately starts the shaft $m^2$, with its pinion $m'$, and the gear $m$ and the main shaft M make one revolution, at the end of which the stop-dog $m^{15}$ throws the clutch out of action, as before.

It is advisable to provide the machine with an emergency-stop, by which it may be arrested at any point in the revolution of the main shaft. For this purpose I mount on the frame an upright shaft $m^{21}$, provided with an operating-handle $m^{22}$ and with an arm $m^{23}$. When the shaft is rotated by the handle, the arm $m^{23}$ acts against the upper end of the lever $m^{13}$, imparting to it the same motion that it receives through the automatic stop-dog and causing it through the intermediate parts to disengage the clutch, the disengaging action being the same as the automatic stop, except that the movement is effected through the manually-operated arm $m^{23}$ instead of the automatic dog $m^{15}$. When the arm $m^{23}$ is released, the machine will resume its motion and continue until it is automatically arrested at the end of the line.

As motion must be imparted continuously to the assembling and distributing devices, the pulley $m^3$, which is driven continuously, is connected by belt $m^{25}$ to pulley $m^{26}$, carrying pulleys which communicate motion, respectively, through belt $m^{27}$ to the distributer-screws and attendant parts and through belt $m^{28}$ (see Figs. 1 and 2) to a pulley-shaft carrying the bevel-pinion $m^{29}$, which imparts motion to pinion $m^{30}$, carrying the pulley which drives the upper end of assembler-belt E.

The two distributer-screws $x$ are geared together, as usual, and one of them carries a cam for actuating the matrix-lift V. All of these details are essentially the same as in the ordinary commercial linotype of the present day and are not claimed herein.

The justifying head or bar lying beneath the spacers when they are in operative position, as shown particularly in Fig. 10, is carried by vertical guide-rods at the top of the swinging frame $l^5$ and is actuated by link $t'$, connected to a lever $t^2$, which is pivoted at its opposite end to the main frame and actuated by a lifting-spring $t^3$ and a depressing-cam $t^4$, mounted on the main shaft M.

The carrier-belt and the assembling devices and the distributing mechanism at the top of the machine being kept constantly in motion, the machine is operated as follows: The operator depresses in proper sequence the finger-keys representing the individual letters and the space-key. The depression of the finger-keys is followed by the operation of the corresponding escapements C and the release of the appropriate matrices Y one at a time from the lower end of the magazine B. The matrices, falling on the belt E, are carried down and delivered in an upright position successively into the assembler F in front of the star-wheel $e^3$, by which the assembled or composed line is gradually pushed forward, leaving a constant space at the rear end adjacent to the star-wheel for the admission of the succeeding matrices and the spacers Z, which are dropped from their magazine J directly into the assembler at the end of the line when the space-key is depressed. It will be observed that the line is assembled between the yielding resistant H at the front and the fingers $i$ of the slide I, which for the time being stand at the sides of the assembling-wheel, as shown in Figs. 23 and 24. When the composition of the line is completed, it is transferred to the left by means of the slide I, actuated by the hand-lever $i^4$, the movement of the line being continued out of and beyond the assembler F and into the elevator K. On the completion of the movement the resistant H is released and swings back out of the way, and the return of the slide I to the right is accompanied by the return of the resistant H to its original operative position preparatory to the composition of the next line. This return movement of the parts is accompanied by the automatic starting of the machine through the tripping of the dog $m^{15}$. The mold-carrying frame swings rearward toward the pot. The jaw or abutment P' retreats in order to give space between the jaws for the free entrance of the composed line. The elevator K descends, placing the composed line between the jaws or abutments and in front of the mold. As the elevator falls the mold slides to the right from the position occupied when delivering the slug to a position between the mouth of the pot and the line of matrices. The jaw P' closes toward its companion. The pressure-arm Q swings against the elevator K, pressing the matrices against the mold and effecting their substantial alinement, and then slightly retreats to relieve them from pressure. The spacers Z are next pushed forward through the line of matrices by the follower T to effect the elongation or justification of the line. The vise-jaw P' retreats slightly, relieving the matrices from side pressure and friction. The elevator K is lifted by its actuating-cam, so as to bring the lower ears of the matrices tightly against the under edge of the mold, thereby effecting the alinement of their characters vertically. The jaw P' closes to its final position. The pressure-arm Q forces the elevator rearward, pressing the matrix-line tightly against the mold, thereby effecting the exact alinement of the matrices and spacers horizontally and the tight closing of the face of the mold, which is at the same time crowded backward closely against the mouth of the pot O. The pump-plunger $o'$ descends, delivering the molten metal through the mouthpiece into the mold and against the matrices at its front, thereby producing the slug or linotype. The pump-plunger rises. The pressure-arm Q retreats with the elevator K, thereby pulling the matrices and spacers away from the front edge of the slug in the mold. The justifying-head or pusher T descends from the spacers. The jaw P' retreats, thus releasing the end pressure on the line, so that the sliding members of the spacers Z may descend to their original position in the line. The mold-supporting frame swings upward, separating the mold from the pot-mouth and breaking the sprues or connections between the base of the slug and the metal in the mouth of the pot. The mold L, containing the slug, slides to the left until it stands in front of the ejector N, which advancing drives the slug out of the mold and between the trimming-knives S, after which it immediately retreats. Simultaneously with the last action the elevator K rises from the casting-level, its lowest position, to the top of the machine, to a level with the distributing devices. The pusher-slide U transfers the line of matrices to the right and presses it constantly forward toward the lifting device, by which the successive matrices are presented to the carrying-screws on the distributing-rail. During this transfer the protruding ears of the spacers in the line enter the oblique grooves at the sides of the guide or channel, and the spacers are carried down out of the line and permitted to fall into the chute, by which they are transferred to their magazine J. The matrices under the impulse of the screws travel along the distributer-bar, from which they are suspended until they are directly over their respective channels in the magazine, whereupon they are released by the distributer-teeth and permitted to fall into it.

The cycle of operations is completed and the linotype delivered from the machine to the galley during each revolution of the main shaft M, which comes automatically to a stop as soon as the operation is completed, the assembling and distributing devices, however, continuing their motion, while the other parts remain at rest until the composition of a second line is completed.

Having described my invention, what I claim is—

1. In a linotype-machine, in combination with the upright magazine, having an inclined lower end, a series of escapement devices located at the lower end of the magazine, and an inclined conveyer-belt lying closely beneath the magazine and escapements for delivering the matrices to the assembling or composing mechanism whereby the delivery of the matrices in proper sequence to the line is insured.

2. In a linotype-machine, the upright magazine having a horizontal upper end and an inclined lower end, in combination with a distributer lying immediately over the upper end, a series of escapements located at the extreme lower end of the magazine, an inclined belt lying immediately beneath the magazine to receive the matrices therefrom, and an assembler or holder to receive the matrices.

3. In a linotype-machine, in combination with means for delivering the matrices thereto, an inclined conveyer-belt E, in combination with an overlying yielding pressure device to act upon the matrices carried thereunder by the belt.

4. In a linotype-machine, an inclined conveyer-belt E, in combination with an elastic pressure-wheel G, overlying the same.

5. In a linotype-machine, the combination of the inclined matrix-conveying belt, an assembler F to receive the matrices, an intermediate stationary matrix-guide and support $e'$, and an overlying finger $e^4$ to prevent the matrices from overshooting said support.

6. In a linotype-machine, an assembler F to receive the matrices, in combination with a star-wheel $e^3$, a yielding resistant H, hinged to its carrier-slide, and a pusher I, adapted to straddle the star-wheel as shown.

7. In a linotype-machine and in combination with the assembler and means for delivering matrices successively thereto, the yielding resistant H, pivoted to its slide, and a pusher I, having a finger $e^6$ to engage the resistant.

8. In a linotype-machine and in combination with the yielding resistant H and the slide by which it is carried, a shoulder $h^7$ for restoring the resistant to its normal position.

9. In a linotype-machine and in combination with the yielding resistant H, its carrier-slide $h$ and a locking device $h^2$, a stationary pin $h^5$ to disengage the latch and release the resistant.

10. In a linotype-machine, the combination of a mold, a series of matrices and a support K for the line of matrices, and pressure devices permitting independent motion of said support, that the matrices may adjust themselves to the face of the mold.

11. In a linotype-machine and in combination with a mold, a support K for the line of matrices, and a movable carrier to which said support is loosely connected, whereby it is permitted to move freely that the matrices may seat themselves tightly against the mold.

12. In a linotype-machine, the combination of a mold, a support or elevator for the line of matrices, and an unattached pressure device Q, acting to force the matrix-support and matrices toward the mold while permitting independent motion of the support.

13. In a linotype-machine, the combination of a mold, a vertically-movable carrier $k'$, a matrix support or elevator K, movable to and from the mold independently of the carrier, and a pressure device Q, acting against the support K and permitting independent motion of the latter.

14. In a linotype-machine, the combination of a fixed melting-pot for delivering metal to the mold, a mold mounted to slide horizontally to and from the pot, a mold-support mounted to move to and from the pot at right angles to the line in which the mold slides, a matrix elevator or support K movable to and from the face of the mold, and an independent pressure device, acting through the jaws or abutments to confine the matrix-line endwise.

15. In a linotype-machine, the combination of the fixed pot, the mold arranged to slide horizontally in the direction of its length, the mold-supporting frame arranged to swing to and from the pot, the matrix-confining jaws carried by said frame, the justifier-slide also carried by said frame, the vertically-movable elevator or matrix-support K, and a pressure device Q to act upon said elevator.

16. In a linotype mechanism and in combination with a fixed melting-pot, a vertically-reciprocating elevator to support the matrix-line, mounted to have freedom of motion in a horizontal direction, a horizontally-sliding mold, a mold-supporting frame, mounted to swing on a horizontal axis to and from the pot, matrix-confining jaws or abutments, and a pressure device to act upon the elevator when it stands with the matrices in front of the mold.

17. In a linotype-machine, the vertically-reciprocating elevator or matrix-support K, in combination with its carrying-frame and intermediate sustaining-links.

18. In a linotype-machine and in combination with a mold to coöperate with the matrices, the vertically-reciprocating elevator K to sustain the line of matrices, the carrier, loosely connected to said elevator, and springs tending to urge the elevator away from the mold.

19. In a linotype-machine, a matrix-sustaining jaw, an oscillating screw threaded at one end in a fixed support to cause its end motion, and an adjustable nut on said screw to control the position of the jaw, whereby the jaw may be permitted a slight forward-and-backward movement and also be adjusted to operate in different locations according to the length of line required.

20. In a linotype-machine, a frame $l^5$, arranged to swing on a horizontal axis, said frame provided with matrix-confining jaws and a horizontally-sliding mold.

21. In a linotype-machine, the fixed pot and an elevator or support for presenting the matrices in operative position, in combination with a frame $l^5$, having the matrix-confining jaws, the sliding mold, and the slug-trimming knives mounted thereon.

22. In a linotype-machine, a frame $l^5$ swinging on a horizontal axis, in combination with the sliding mold mounted therein, slug-trimming knives also mounted on said frame, and a coöperating ejector.

23. In a linotype-machine, a frame $l^5$ arranged to swing forward and backward, and a sliding mold mounted therein, in combination with a reciprocating ejector N, mounted in the main frame $l^5$ in position to aline with the mold when the frame is in its backward position.

24. In a linotype-machine, the combination of the fixed pot, the vibrating frame, having the sliding mold, the matrix-confining jaws, the justifying-slide T and the trimming-knives S mounted thereon, the vertically-movable matrix-supporting elevator K and the reciprocating ejector N.

25. In a linotype-machine, the combination of the vibrating frame $l^5$, the mold mounted to slide horizontally in said frame, and the connected knives S S, removably mounted in seats in said frame.

26. In a linotype-machine, the combination of supporting-guides and two connected trimming-knives S S seated in said guides, free to be lifted out of the same, as described and shown.

27. In a linotype-machine, a matrix-supporting elevator K, a vertically-movable carrier to which said elevator is loosely connected to move horizontally for the purpose described, a distributing mechanism to which said elevator is raised, and guides to bring the elevator into exact alinement with the distributing mechanism.

28. In a linotype-machine, the vertical magazine and the escapement-bar X lying directly over the upper end of the magazine, in combination with the intermediate mouthpiece hinged to the magazine, having the series of partition-plates and pockets to receive the arrested matrices, substantially as shown.

29. In a linotype-machine, the combination of the swinging mold-sustaining frame, an independently-swinging pressure device Q to act upon the matrix-support, the cam to actuate the same, and a loose connection through which the pressure device effects the retraction of the mold-supporting frame.

30. In a linotype-machine, the combination of the vertically-reciprocating elevator, carrier $k'$, its lifting-chain $k^3$, winding-drum $k^5$, its actuating-pinion, the sector-lever to actuate the pinion, and the cam acting upon the lever.

31. In a linotype-machine, the combination of an elevator K for the matrix-line, with the matrix-guiding bar $u'$ and the vertically-yielding bar $u$ to coöperate therewith, whereby a continuous guide is afforded for the upper ends of the matrices as they pass to the distributer.

32. In a linotype-machine, a vertically-movable elevator K having internal shoulders to sustain the line of matrices and having also a short toothed bar $u'$ to engage the teeth of and sustain the matrices as they are carried horizontally out of the elevator, in combination with the vertically-yielding bar $u$, arranged to encounter and aline with the bar $u'$, that its teeth may receive and sustain the matrices as the latter leave the elevator.

33. In the distributing mechanism of a linotype-machine, the longitudinally-toothed bar $u$ to engage the teeth of the assembled matrices and sustain them, in combination with the side plates having horizontal and inclined grooves $u^2$ opposite the sides of the bar $u$ to guide the ears of the spacers and direct them downward out of the matrix-line.

34. In a linotype-machine, the combination of a driving-clutch, a slide I for transferring the composed line of matrices, and a lever $i^4$ arranged to advance the slide by a movement in one direction and to drop the clutch into action by a movement in the reverse direction, whereby the vibration of the lever is caused to first place the matrices in operative position and thereafter start the mechanism.

35. The combination of the shaft $m^2$, its driving-pulley $m^3$, and the intermediate automatically-engaging clutch, the pinion $m'$ fixed on said shaft, a gear-wheel $m$ driven thereby, a pivoted stop-dog $m^{15}$ carried by said gear, and a clutch-controlling lever $m^{13}$, arranged to be acted upon by the stop-dog, and means for pulling the dog out of engagement with said lever to start the machine.

36. In a linotype-machine, a driving-clutch and a clutch-controlling lever $m^{13}$, in combination with the gear-wheel $m$, receiving motion from the clutch, a stop-dog $m^{15}$ carried by said gear and arranged to act on the clutch-controlling lever, and a hand-lever $i^4$ having a latch or dog $m^{20}$ to pull the stop-dog out of action.

37. In a linotype-machine, the combination of the automatically-engaging driving-clutch, a lever $m^{13}$ to disengage the clutch, a wheel $m$ having a dog to actuate said lever and disengage the clutch automatically at the end of each revolution, a hand-lever $i^4$ with a latch for disengaging the stop-dog to start the mechanism, and an independent manual device, as $m^{23}$, to act on the clutch-controlling lever $m^{13}$, whereby the motion of the parts may be arrested at any time.

38. In a linotype-machine, the combination of the vertically-reciprocating elevator, the carrier, its lifting flexible connector, the winding-drum, its actuating-pinion, the sector-lever to actuate the pinion, and the cam acting upon the lever.

39. In a linotype-machine, the combination of the vertically-reciprocating elevator for the composed line of matrices, a carrier for said elevator mounted to travel on a guide and loose connection between the elevator and carrier whereby independent movement and adjustment of the elevator is permitted.

40. In a linotype-machine, a movable mold-support in combination with a slug-trimming knife secured thereto and movable therewith.

41. In a linotype-machine, the combination of a movable support 15, a sliding mold therein, trimming-knives affixed to the said support, an ejector and ejector-guides also affixed to said support.

In testimony whereof I hereunto set my hand, this 11th day of April, 1901, in the presence of two attesting witnesses.

JOHN R. ROGERS.

Witnesses:
P. T. DODGE,
JOHN F. GEORGE.